(12) United States Patent
Schouweiler, Jr.

(10) Patent No.: US 9,920,684 B2
(45) Date of Patent: Mar. 20, 2018

(54) FUEL-STRATIFIED COMBUSTION CHAMBER IN A DIRECT-INJECTED INTERNAL COMBUSTION ENGINE

(71) Applicant: David J. Schouweiler, Jr., Minneapolis, MN (US)

(72) Inventor: David J. Schouweiler, Jr., Minneapolis, MN (US)

(73) Assignee: Dave Schouweiler, Minneapolis, MN (US)

( * ) Notice: Subject to any disclaimer, the term of this patent is extended or adjusted under 35 U.S.C. 154(b) by 537 days.

(21) Appl. No.: 14/072,369

(22) Filed: Nov. 5, 2013

(65) Prior Publication Data

US 2014/0123934 A1    May 8, 2014
US 2015/0247444 A2    Sep. 3, 2015

Related U.S. Application Data

(60) Provisional application No. 61/723,659, filed on Nov. 7, 2012.

(51) Int. Cl.
| | |
|---|---|
| *F02B 17/00* | (2006.01) |
| *F02B 23/10* | (2006.01) |
| *F02B 25/14* | (2006.01) |

(52) U.S. Cl.
CPC .......... *F02B 17/005* (2013.01); *F02B 23/101* (2013.01); *F02B 23/105* (2013.01); *F02B 25/14* (2013.01); *Y02T 10/125* (2013.01)

(58) Field of Classification Search
None
See application file for complete search history.

(56) References Cited

U.S. PATENT DOCUMENTS

| | | |
|---|---|---|
| 3,283,751 A | 11/1966 | Goossak |
| 4,183,343 A | 1/1980 | Tanahashi et al. |
| 4,318,376 A | 3/1982 | Nakamura |

(Continued)

OTHER PUBLICATIONS

"U.S. Appl. No. 12/794,534, Non Final Office Action dated Jun. 7, 2012", 14 pgs.

(Continued)

*Primary Examiner* — Hung Q Nguyen
*Assistant Examiner* — Brian P Monahon
(74) *Attorney, Agent, or Firm* — Schwegman Lundberg & Woessner, P.A.

(57) ABSTRACT

A combustion chamber is provided within an internal combustion engine, the chamber bounded by a cylinder bore, a primary end, and a secondary end. The secondary end reciprocates between a TDC position nearest the primary end and a BDC position. Induction and exhaust ports are timed to open and close to transfer air into, and gasses from, the chamber. The chamber becomes fuel stratified when the secondary end is positioned within a stratified distance of the primary end. When stratified, the chamber is comprised of a central region, a perimeter region, and a transfer passageway between regions. A fuel injector at the primary end injects fuel only into the central region and only prior to ignition. The perimeter region pumps air into the central region prior to ignition, creating tumble turbulence. Combustion is initiated near TDC in the central region and concluded near TDC in the transfer passageway.

10 Claims, 12 Drawing Sheets

(56) References Cited

U.S. PATENT DOCUMENTS

| | | | |
|---|---|---|---|
| 4,495,907 A | 1/1985 | Kamo | |
| 4,691,673 A | 9/1987 | Kojima | |
| 4,774,926 A | 10/1988 | Adams | |
| 5,060,609 A | 10/1991 | Merritt | |
| 5,072,699 A * | 12/1991 | Pien | F01M 1/04 |
| | | | 123/196 R |
| 5,161,497 A * | 11/1992 | Simko | F02D 13/0219 |
| | | | 123/90.15 |
| 5,522,371 A | 6/1996 | Kawamura | |
| 5,645,028 A | 7/1997 | Matsuoka | |
| 5,738,061 A | 4/1998 | Kawamura | |
| 5,915,351 A | 6/1999 | Regueiro | |
| 6,044,820 A | 4/2000 | Domanchuk | |
| 6,434,939 B1 * | 8/2002 | Beveridge | F02B 33/36 |
| | | | 123/559.1 |
| 6,598,581 B2 | 7/2003 | Kempf | |
| 6,874,489 B2 | 4/2005 | Yonekawa | |
| 7,104,226 B2 | 9/2006 | Endoh | |
| 7,191,770 B1 | 3/2007 | Anderson | |
| 2002/0108596 A1 * | 8/2002 | Gracyalny | F01L 1/18 |
| | | | 123/182.1 |
| 2003/0000494 A1 | 1/2003 | Kremer | |
| 2003/0136356 A1 * | 7/2003 | Namkung | F02C 3/055 |
| | | | 123/27 R |
| 2003/0192517 A1 * | 10/2003 | Gates | F02D 11/10 |
| | | | 123/568.16 |
| 2003/0221658 A1 * | 12/2003 | Hiraya | F02B 23/10 |
| | | | 123/279 |
| 2004/0211388 A1 * | 10/2004 | Hiraya | F02B 17/005 |
| | | | 123/276 |
| 2005/0235957 A1 | 10/2005 | Duncan | |
| 2009/0151708 A1 * | 6/2009 | Schouweiler, Jr. | F01L 3/02 |
| | | | 123/668 |
| 2009/0301086 A1 * | 12/2009 | Ralston | F02B 41/06 |
| | | | 60/620 |
| 2010/0258099 A1 * | 10/2010 | Andersson | F02D 31/006 |
| | | | 123/676 |
| 2010/0300417 A1 * | 12/2010 | Schouweiler, Jr. | F01L 1/38 |
| | | | 123/661 |

OTHER PUBLICATIONS

Schouweiler, Dave, "Insulated Pulse-Combustion Engine", [Online]. Retrieved from the Internet: <URL: http://contest.techbriefs.com/2013/entries/sustainable-technologies/by-views/3864->, (Jul. 1, 2013), 3 pgs.

Setright, L. J.K., Some Unusual Engines, London : Mechanical Engineering Publications for the Institution of Mechanical Engineers, ; ISBN: 0852982089 9780852982082, (1975), 43-46.

* cited by examiner

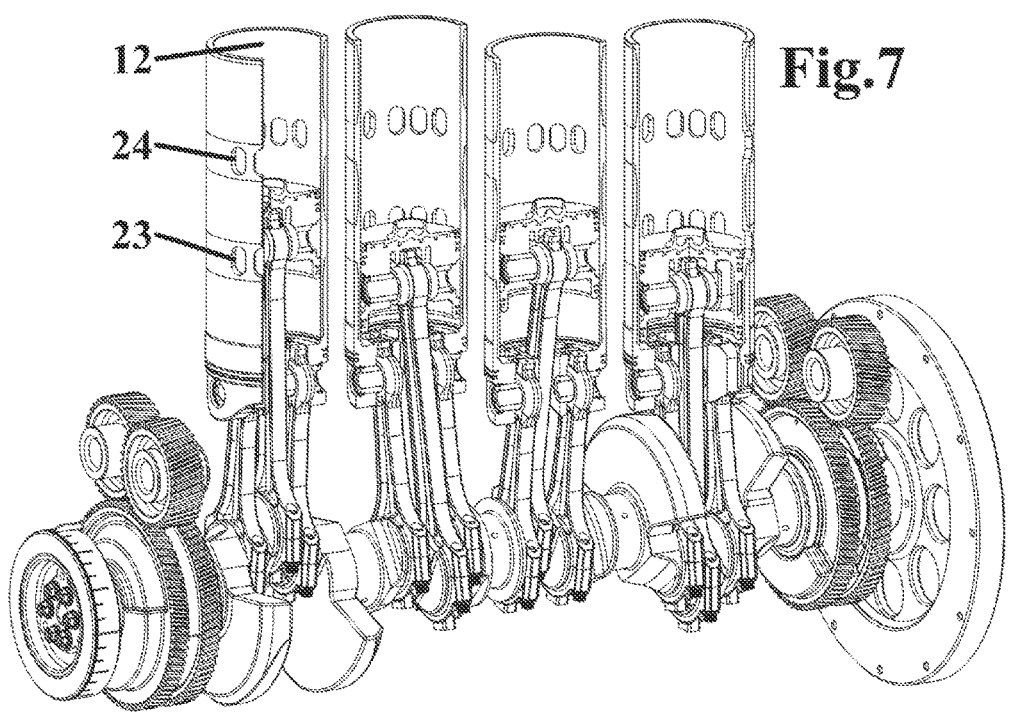

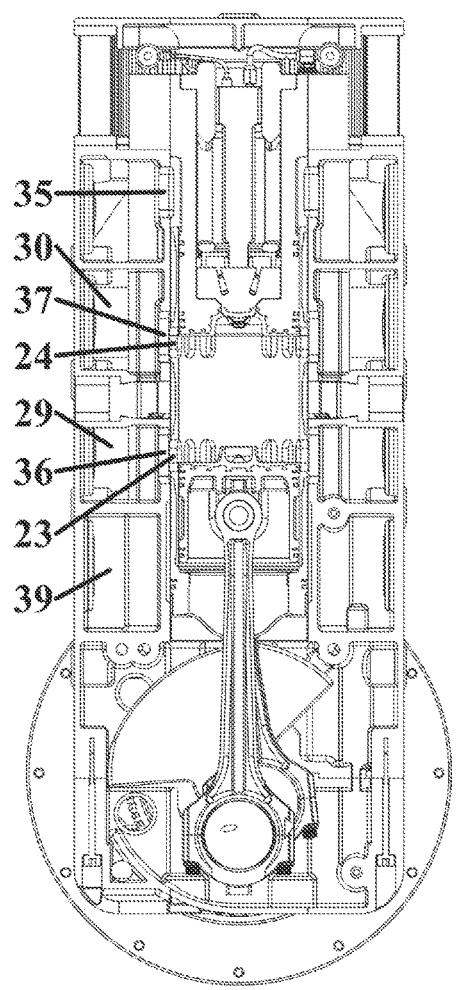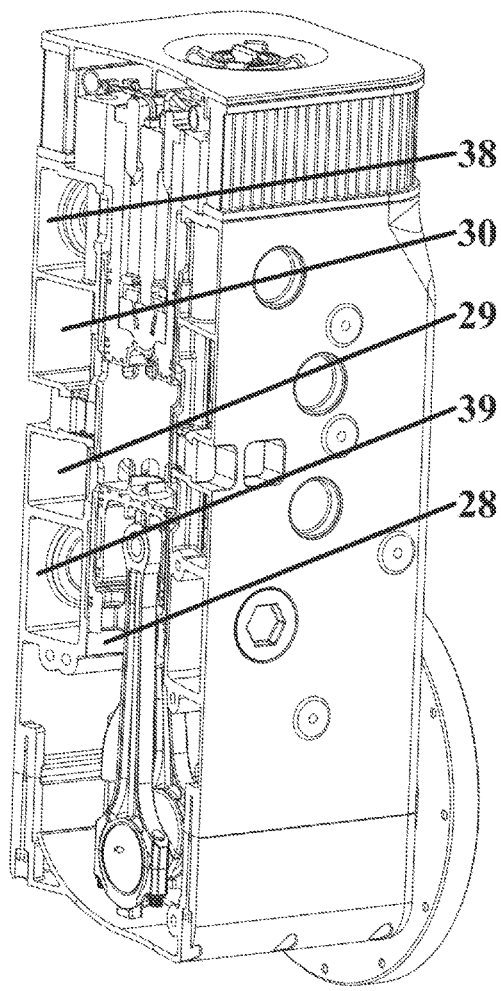

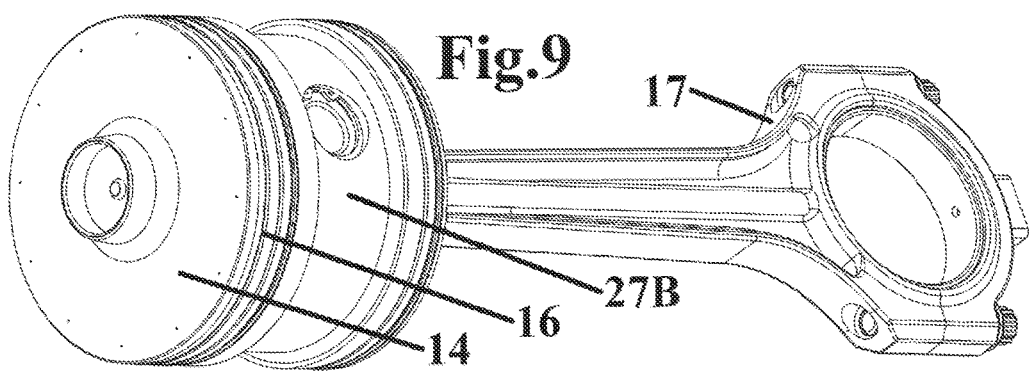
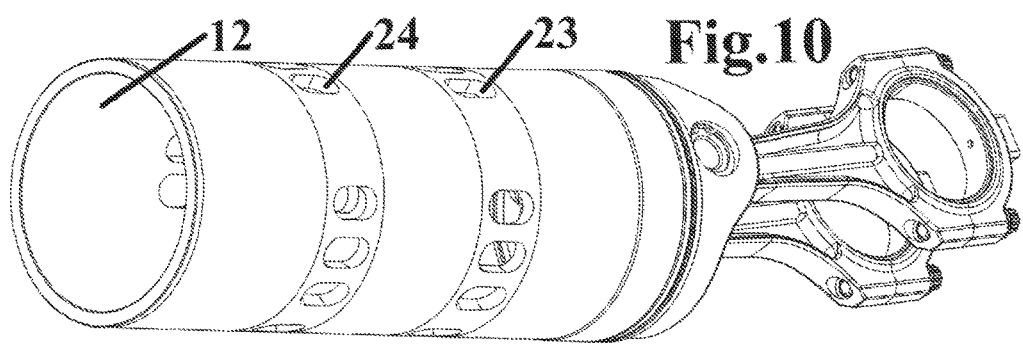
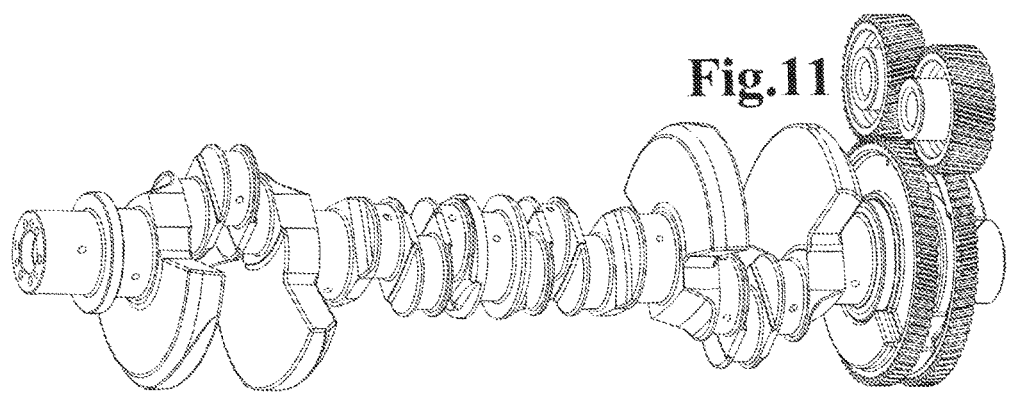

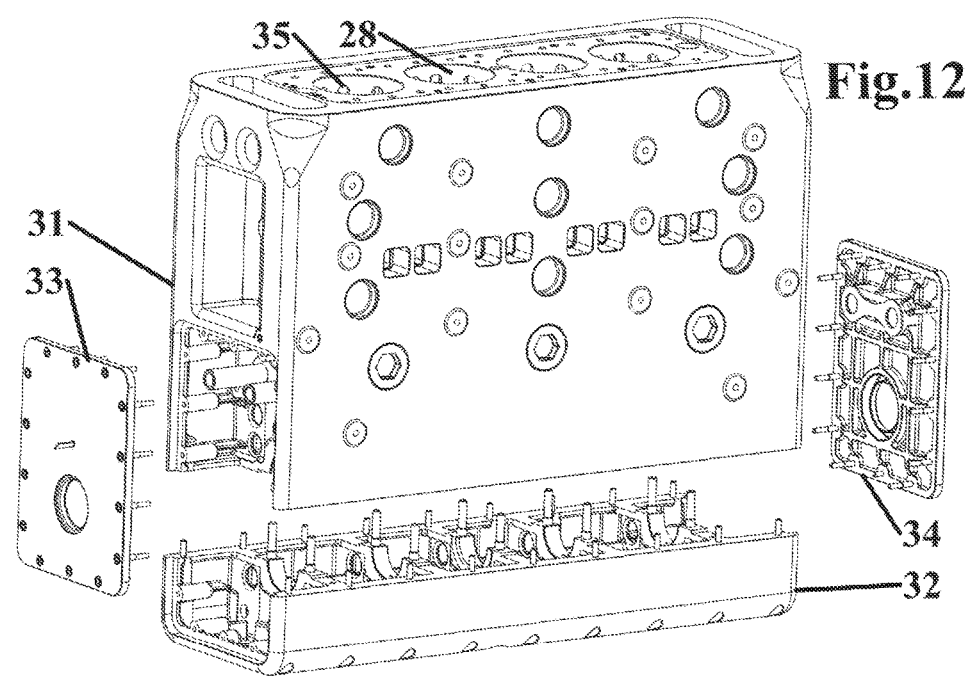

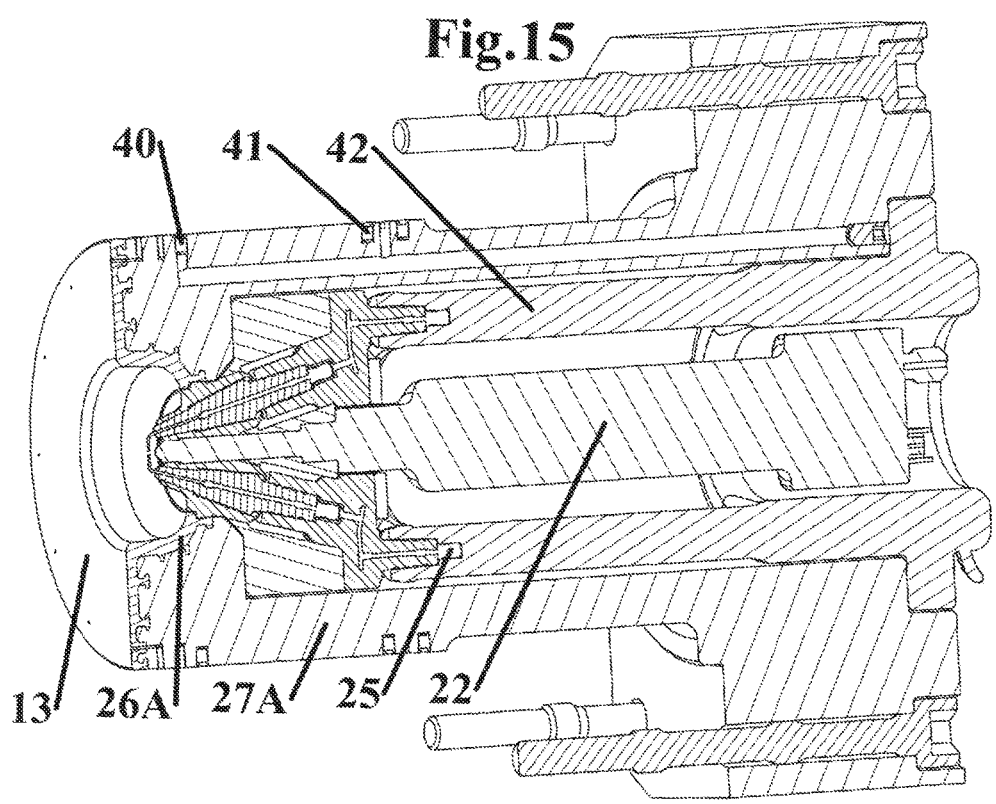

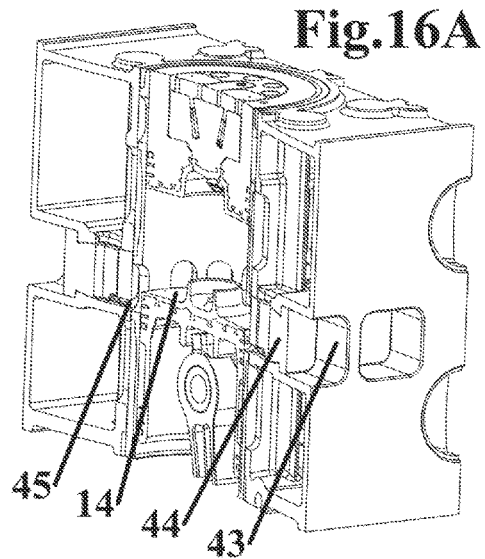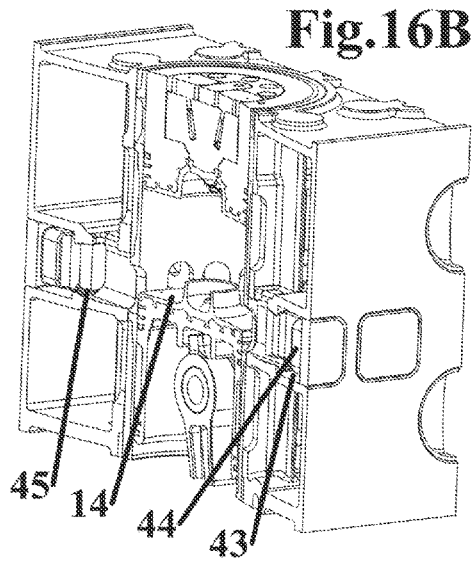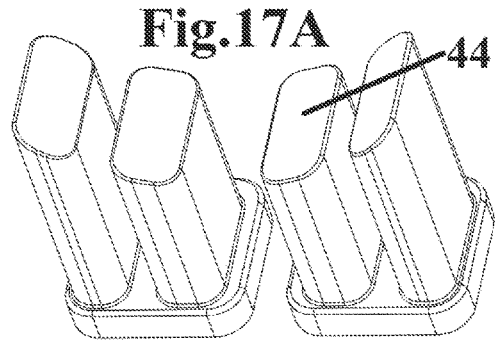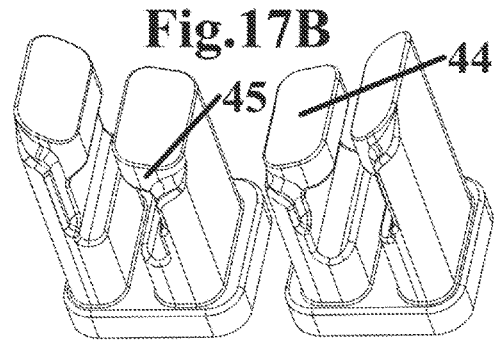

FUEL-STRATIFIED COMBUSTION CHAMBER IN A DIRECT-INJECTED INTERNAL COMBUSTION ENGINE

CLAIM OF PRIORITY AND INCORPORATION BY REFERENCE

This application claims the benefit under 35 U.S.C. § 119(e) of U.S. Provisional Patent Application Ser. No. 61/723,659, filed on Nov. 7, 2012, which is hereby incorporated by reference in its entirety. This application is related to U.S. Provisional Patent Application Ser. No. 61/558,890, filed Nov. 11, 2011, and U.S. patent application Ser. No. 12/794,534, filed Jun. 4, 2010, both of which are hereby incorporated by reference in their entirety.

TECHNICAL FIELD

The present application relates to internal combustion engines, and in particular to apparatus and methods for a fuel-stratified combustion chamber in a direct-injected internal combustion engine.

BACKGROUND

There is an ongoing effort to improve fuel mileage in motor vehicles. In the last half century, fuel mileage improvements from internal combustion engines have most often resulted from volumetric efficiency improvements (i.e.: increased peak horsepower per unit volume of cylinder displacement) rather than thermal efficiency improvements. Fuel mileage gains have come by way of increased strength and horsepower of engines, allowing smaller displacement engines to be installed into larger vehicles, where the engines are tasked to operate within a more thermally efficient segment of their operating range. Fuel mileage improvements can become tougher to achieve as small displacement engines more routinely populate large vehicles.

Atkinson engines, which are found in some of today's most fuel efficient cars, achieve improved thermal efficiency through an expansion process which reduces volumetric efficiency and which expels less heat energy to the exhaust duct than do equivalently powered Otto engines. HCCI engine development programs, now popular in laboratories around the world, achieve improved thermal efficiency through a combustion process which reduces volumetric efficiency and which expels less heat energy to the exhaust duct than do equivalently powered Otto and Diesel engines. Atkinson and HCCI engines suggest some thermodynamic processes with reduced volumetric efficiency and cooler exhaust gas temperature can provide a pathway toward improved engine thermal efficiency and vehicle fuel economy.

Exhaust emissions aftertreatment devices in motor vehicles often require a high exhaust gas temperature to scrub pollutants from the exhaust stream. Some engines which combine high thermal efficiency with low volumetric efficiency will have unconventionally cool exhaust temperatures, rendering many conventional emissions aftertreatment devices inoperative. What is needed is an improved apparatus and method to prevent the formation of pollutants during the combustion reaction in an internal combustion engine, reducing the need for exhaust after treatment.

SUMMARY

The present subject matter provides apparatus and method for a fuel-stratified combustion chamber in a direct-injected internal combustion engine. The apparatus includes a combustion chamber within an internal combustion engine. The combustion chamber is bounded by a cylinder bore, a primary end, and a secondary end, with a chamber volume based on the cylinder bore diameter and dependent on the position of the secondary end with reference to the primary end. The cylinder bore is configured to seal to the primary end to prevent incidental leakage of chamber gasses. The secondary end is configured to reciprocate within the cylinder bore between a top dead center (TDC) position nearest the primary end and a bottom dead center (BDC) position and is configured to seal to the cylinder bore while reciprocating to prevent incidental leakage of chamber gasses. The secondary end is linked to a crankshaft through a connecting rod for the purpose of exporting mechanical energy from the engine.

The chamber volume is configured to become fuel-stratified whenever the secondary end is within a stratified distance of TDC, and the chamber volume is configured to become fuel-unstratified whenever the secondary end is farther than the stratified distance from TDC. The chamber, when stratified, comprises two regions, one is named a central region and the other is named a perimeter region, with a transfer passageway between the two regions, and when unstratified comprises a single region.

The single region is configured to contain substantially no fuel. The perimeter region occupies a volume bounded by the cylinder bore and by areas of the primary end and secondary end adjacent to the cylinder bore, and is configured to contain substantially no fuel. The central region occupies a volume bounded by central areas of the primary end and secondary end, and is configured to contain fuel at the time of ignition. The transfer passageway occupies a volume bounded by the remaining area of the primary end and secondary end not occupied by the two regions and is configured to contain substantially no fuel at the time of ignition. The central region and transfer passageway are configured to combust fuel efficiently when the secondary end is positioned within a combusting distance of TDC. An induction port apparatus located within the bounds of the cylinder bore and primary end not occupied by the central region or transfer passageway is timed to open and close to transfer air into the chamber. An exhaust port apparatus located within the bounds of the cylinder bore and primary end not occupied by the central region or transfer passageway is timed to open and close to transfer gasses from the chamber. An ignition source is configured to control the timing and location of ignition within the central region.

The method includes a chamber volume which is configured prior to ignition to permit direct-injected fuel entry into the central region and to use the transfer passageway as a conduit which transfers air being pumped from the perimeter region toward the central region for the purpose of reinforcing fuel-stratification while creating tumble turbulence to mix fuel and air within the central region. Fuel injection is timed to substantially end prior to ignition. Ignition is timed to occur only when the secondary end is within the combusting distance of TDC.

The chamber volume is configured after ignition to quickly develop combustion in the central region, to expand combustion into the transfer passageway, and to substantially conclude combustion within the transfer passageway while the secondary end remains within the combusting distance of TDC, such that substantially no fuel reaches the perimeter region.

The combustion chamber can comprise a layer of combustion-resistant thermally insulating material occupying surfaces of the central region and transfer passageway for the purpose of providing hotter combustion chamber surfaces thereby reducing the formation of quench-type pollution emissions, and which quickens chamber volume warm-up thereby reducing cold-start forms of pollution emissions, and which retains heat energy within the chamber volume thereby improving performance and fuel economy. The combustion chamber can further comprise a layer of thermally insulating material occupying various surfaces of the perimeter region which retain heat energy within the chamber volume thereby improving performance and fuel economy. The heat energy absorbed by the combustion chamber conducts at a low rate through the layer of thermally insulating material whereupon the heat energy then conducts at a nominal rate throughout the engine. The heat energy then conducts into the inducted air and exhausted gasses and is ultimately carried away by the exhausted gasses, eliminating the need for a discrete heat energy exporting apparatus within the engine, in various embodiments.

This summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their equivalents.

BRIEF DESCRIPTION OF DRAWINGS

FIG. 7 is a cutaway view containing the rotating, reciprocating, and counterbalance components of an embodiment of the insulated pulse engine.

FIGS. 8A and 8B show two orientations of a cutaway view of an embodiment of the insulated pulse engine's cylinder 4, with secondary end positioned at BDC, and with induction port and exhaust port apparatus included in the cutaway to assist viewing.

FIG. 9 shows an embodiment of a secondary end assembly, sometimes called a piston assembly, for the insulated pulse engine.

FIG. 10 shows an embodiment of a cylinder bore assembly, sometimes called a reciprocating cylinder assembly or sleeve valve assembly, for the insulated pulse engine.

FIG. 11 shows an embodiment of a partial crankshaft assembly for the insulated pulse engine.

FIG. 12 shows an exploded view of a cylinder block assembly for the insulated pulse engine.

FIG. 15 shows a section view of an embodiment of the primary end assembly for the insulated pulse engine.

FIG. 16A shows a cutaway view of the insulated pulse engine with idling ports in the cylinder block and with associated idling plungers positioned inward for efficient full-throttle operation, according to an embodiment. FIG. 16B shows a cutaway view with associated idling plungers positioned outward for efficient idling operation. The secondary end in these two views is positioned midway through the hyper-expansion cycle, according to an embodiment.

FIG. 17A shows a perspective view of an idling plunger pair. FIG. 17B shows an idling plunger pair which additionally incorporates an expansion buffering aperture, according to an embodiment.

DETAILED DESCRIPTION

Figure 1:
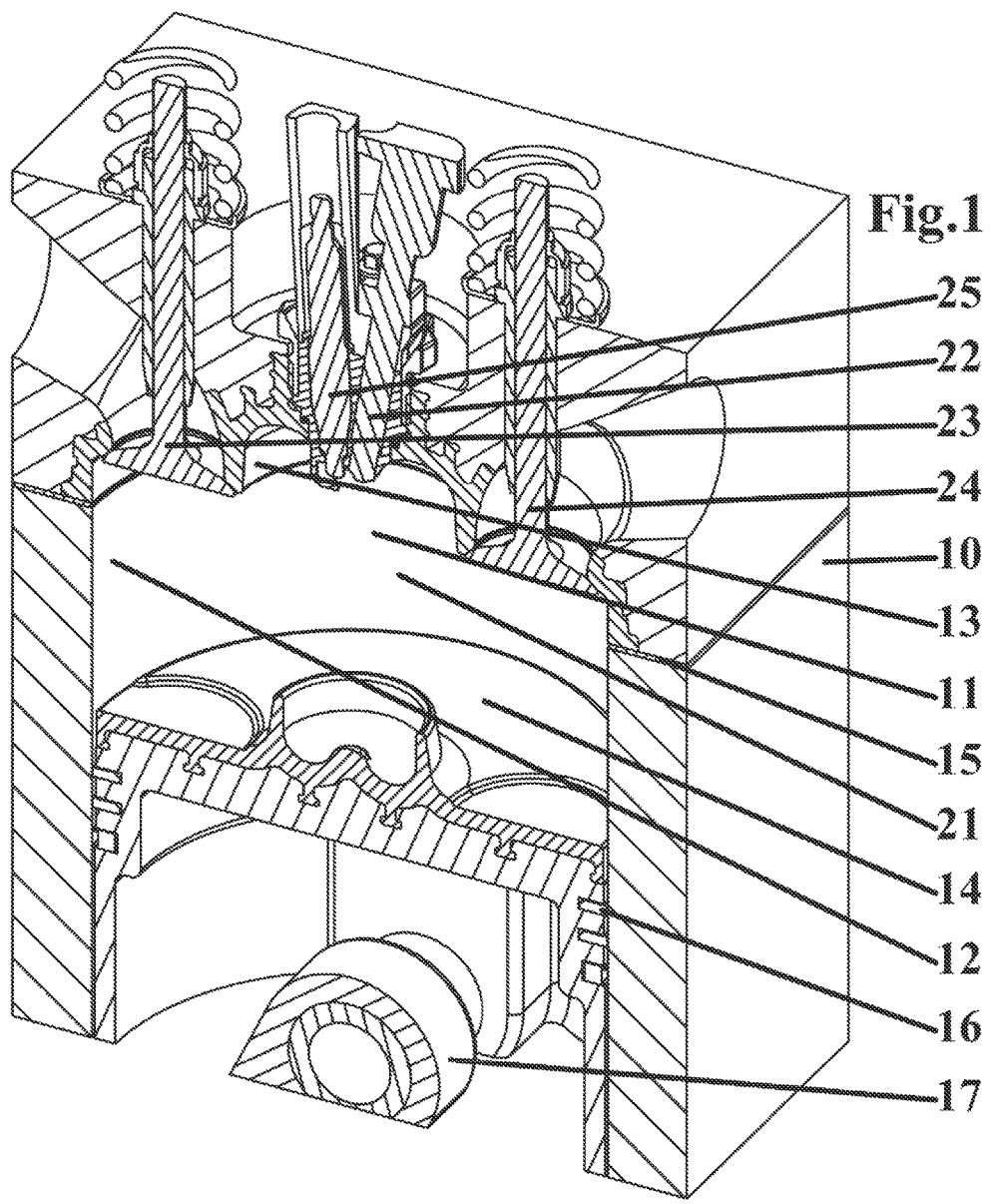
FIG. 1 is a section view of a combustion chamber apparatus for a 4-stroke internal combustion engine referred to as an insulated pulse engine, according to an embodiment of the present subject matter.

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Exhaust emissions aftertreatment devices which scrub pollutants from the exhaust stream of internal combustion engines often require high exhaust gas temperatures to function properly. Unconventionally cool exhaust gas temperatures in some engines which combine high thermal efficiency with low volumetric efficiency will render many conventional emissions aftertreatment devices inoperative, requiring that measures be taken in to prevent the formation of combustion pollutants during the combustion reaction.

Certain combustion chamber features do not support efficient combustion when directly contacted by fuel, including, for example, combustion chamber seals such as piston rings and head gaskets, induction and exhaustion functions such as valve seats, and ignition functions such as heat-rated spark plugs. These features tend to be shaped with crevices and pockets which promote the incomplete oxidation of fuel during combustion, whereupon the resulting pollutants are then expelled into the exhaust stream. A method to prevent the creation of these forms of exhaust pollution is to keep fuel away from creviced and pocketed combustion chamber features, and to remove the crevices and pockets from the remaining chamber features which can contact fuel.

Stratification of fuel within the combustion chamber can keep fuel away from creviced chamber features, preventing the formation of some types of unburned hydrocarbon (UHC) pollutants. Direct fuel injection which occurs during the compression cycle prior to ignition and in conjunction with productive turbulence can prevent the formation of particulate matter (PM), or soot, pollution emissions. Selective thermal insulation of combustion chamber surfaces which occurs in conjunction with productive turbulence can prevent the formation of carbon monoxide (CO) pollution emissions associated with quench surfaces. Selective thermal insulation can also quicken engine warm-up which reduces cold-start forms of pollution emissions. Limiting the allowable temperature and pressure of the combustion chamber gasses through metering of direct fuel injection can minimize the formation of oxides of nitrogen (NOx) pollutants. Applying all of these methods can eliminate the need for emissions aftertreatment devices in an engine.

The present subject matter provides a combustion chamber for an internal combustion engine. FIG. 1 presents the features of a combustion chamber apparatus 10 for use within an internal combustion engine, the apparatus comprising a cylinder bore 12, a primary end 13, and a secondary end 14, according to various embodiments of the present subject matter. There will often be two or more combustion chamber apparatus 10 within an internal combustion engine.

According to various embodiments, a chamber volume 11 is bounded by the cylinder bore 12, the primary end 13, and the secondary end 14, the chamber volume 11 based on the cylinder bore 12 diameter and dependent on the position of the secondary end 14 with reference to the primary end 13.

The cylinder bore 12 is configured to seal 15 to the primary end 13 to prevent incidental leakage of chamber gasses.

Figure 2:
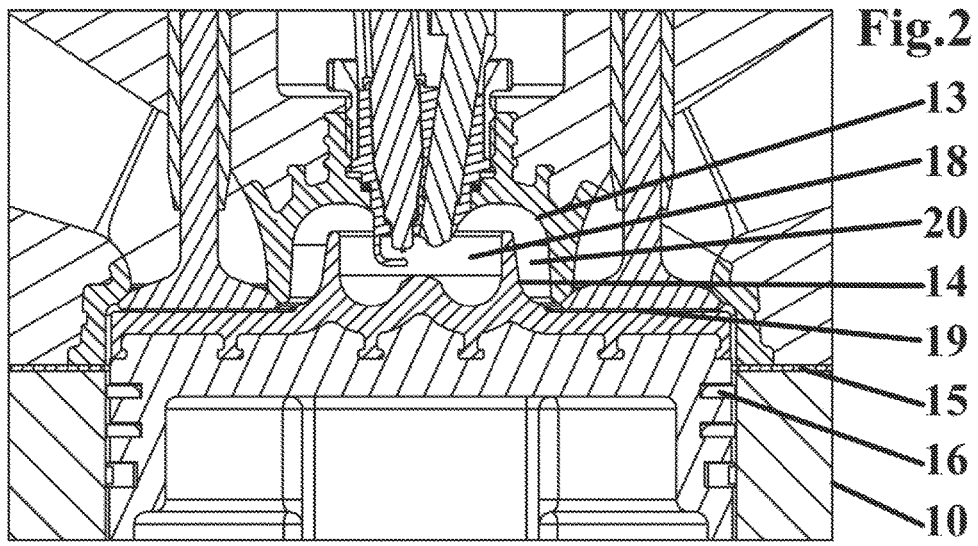
FIG. 2 is a partial view of the apparatus of FIG. 1, with the secondary end positioned at TDC, a position in which the combustion chamber is shaped to combust efficiently and cleanly, according to an embodiment of the present subject matter.

The secondary end 14 is configured to reciprocate within the cylinder bore 12 between a top dead center (TDC) position nearest the primary end 13 and a bottom dead center (BDC) position, and configured to seal 16 to the cylinder bore 12 while reciprocating to prevent incidental leakage of chamber gasses. FIG. 2 presents the secondary end 14 positioned at the TDC position, according to various embodiments.

The secondary end 14 is configured to be linked to a crankshaft through a connecting rod 17 for the purpose of exporting mechanical energy from the engine.

The chamber volume 11 is configured to become fuel-stratified whenever the secondary end 14 is closer than a stratified distance of TDC, and the chamber volume 11 is configured to become fuel-unstratified whenever the secondary end 14 is farther than the stratified distance from TDC.

Figure 3:
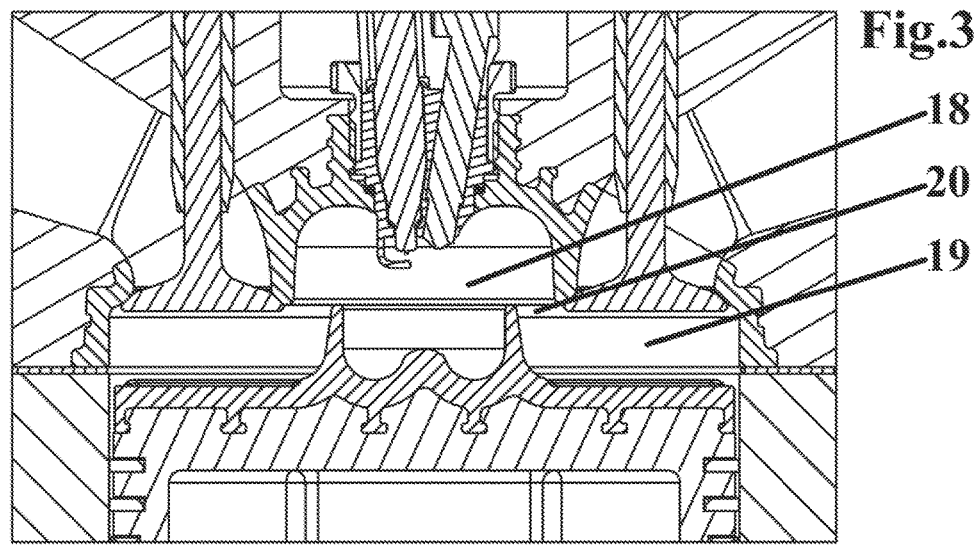
FIG. 3 is a partial view of the apparatus of FIG. 1, with the secondary end at the position which transitions the combustion chamber between fuel-unstratified and fuel-stratified, a position called the stratified distance, according to an embodiment of the present subject matter.

The chamber volume 11, when stratified, comprises two regions, one is named a central region 18, and the other is named a perimeter region 19, with a transfer passageway 20 between the two regions, and the chamber volume 11 when unstratified comprises a single region 21. FIG. 3 shows the secondary end 14 positioned the stratified distance from TDC, according to various embodiments.

The single region 21 is configured to contain substantially no fuel and does not need to support efficient combustion.

The perimeter region 19 includes a volume bounded by an entire area of the cylinder bore 12 between the primary end 13 and secondary end 14, an area of the primary end 13 adjacent to the cylinder bore 12 and near the cylinder bore 12, and an area of the secondary end 14 adjacent to the cylinder bore 12 and near the cylinder bore 12, and is configured to contain substantially no fuel and does not need to support efficient combustion.

The central region 18 includes a volume bounded by a central area of the primary end 13, and a central area of the secondary end 14, and can be centered on the axis of the cylinder bore 12, and is configured to contain fuel at the time of ignition.

The transfer passageway 20 includes a volume bounded by the remaining areas of the primary end 13 and secondary end 14 not occupied by the two regions, and can be annular, and is configured to contain substantially no fuel at the time of ignition.

The central region 18 and the transfer passageway 20 are configured to combust fuel efficiently when the secondary end 14 is positioned within a combusting distance of TDC.

An induction port apparatus 23, configured for unthrottled duct flow and located within the bounds of the cylinder bore 12 and primary end 13 not occupied by the central region 18 or the transfer passageway 20, is configured to open and close to transfer air into the chamber volume 11.

An exhaust port apparatus 24, located within the bounds of the cylinder bore 12 and primary end 13 not occupied by the central region 18 or the transfer passageway 20, is configured to open and close to transfer gasses from the chamber volume 11.

An ignition source, which can be a spark plug 25 mounted to the primary end, is configured to control the timing and location of ignition within the central region 18.

A direct fuel injector 22 is configured to inject fuel into the central region 18.

The chamber volume 11 is configured prior to ignition to permit direct-injected fuel entry into the central region 18 and to use the transfer passageway 20 as a conduit which directs air being pumped from the perimeter region 19 toward the central region 18 for the purpose of reinforcing fuel-stratification while creating tumble turbulence to mix fuel and air within the central region 18. Fuel injection is timed to substantially end prior to ignition.

Ignition is timed to occur only when the secondary end 14 is within the combusting distance of TDC.

A compression ratio sufficient to promote a supersonic combustion wavefront, in combination with a fuel-air equivalence ratio in the central region 18 maintained within the bounds of a half-throttle value and a full-throttle value assures that combustion quickly develops in the central region 18, that combustion expands into the transfer passageway 20, and that combustion substantially concludes within the transfer passageway 20 while the secondary end 14 remains within the combusting distance of TDC, such that substantially no fuel reaches the perimeter region 19.

Figure 4:
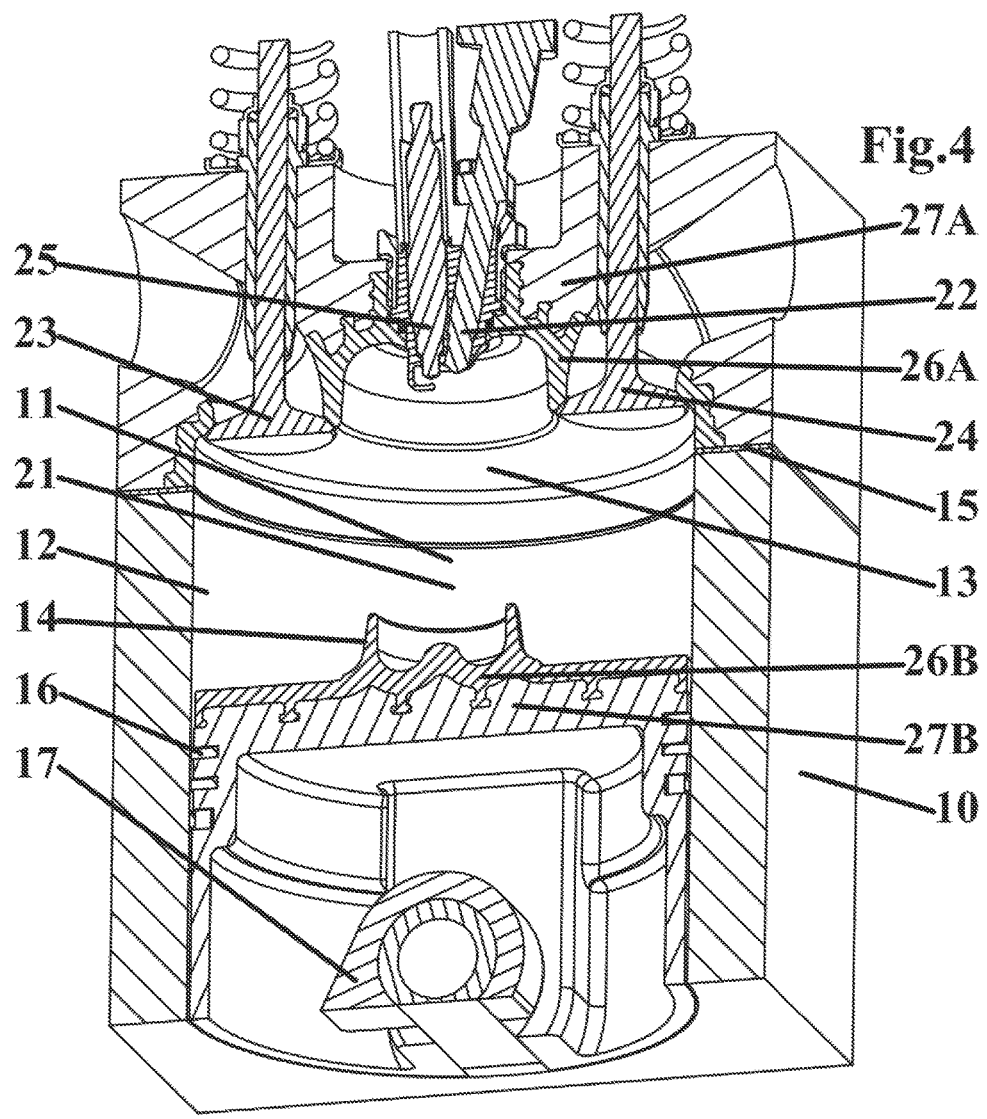
FIG. 4 is an alternate view of the apparatus of FIG. 1, shown with the secondary end at an intermediate position between TDC and BDC, according to an embodiment of the present subject matter.
Figure 5:
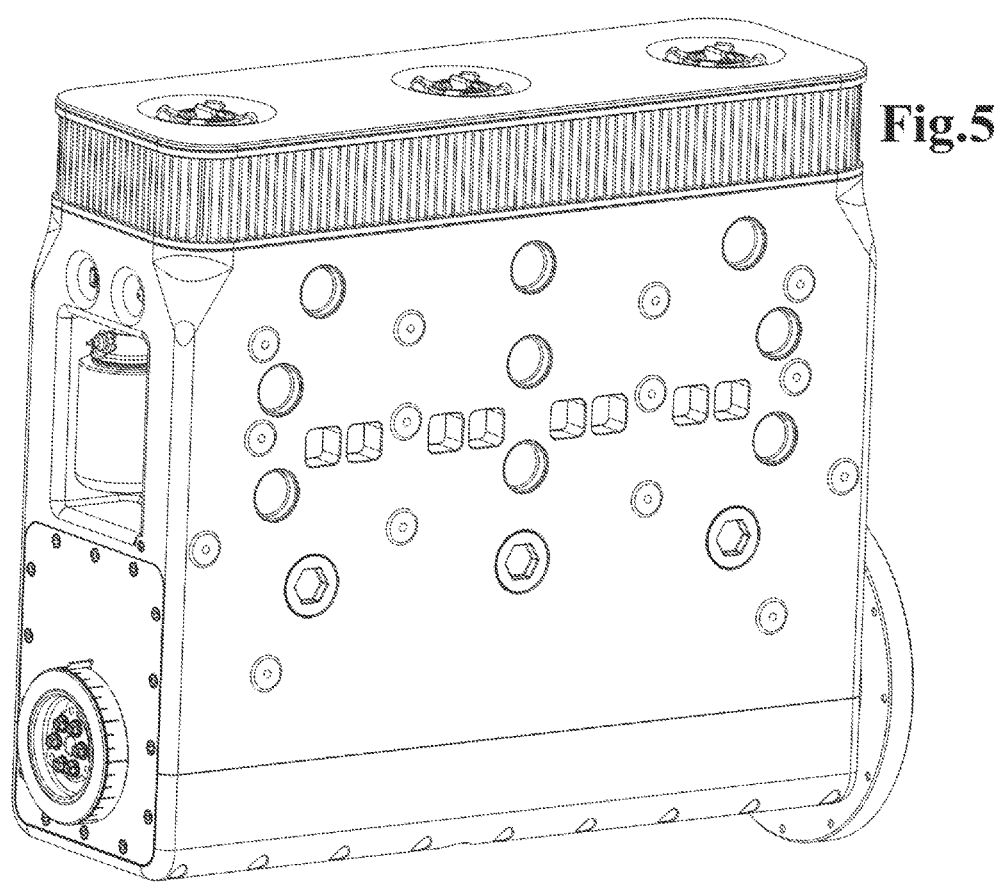
FIG. 5 is a perspective view of a 2-stroke internal combustion engine referred to as an insulated pulse engine, according to an embodiment of the present subject matter.

FIG. 4 shows the combustion chamber apparatus 10 further comprising a layer of combustion-resistant thermally insulating material 26A and 26B occupying a substantial portion of surfaces of the central region 18 and transfer passageway 20 for the purpose of providing hotter combustion chamber surfaces which support the combustion reaction by reducing the formation of quench-type pollution emissions, and which quickens chamber volume 11 warm-up thereby reducing cold-start forms of pollution emissions, and which retains heat energy within the chamber volume 11 to improve performance and fuel economy, in an embodiment.

The combustion chamber apparatus 10 further comprising a layer of thermally insulating material 26A and 26B occupying a substantial portion of surfaces of the perimeter region 19 on the primary end 13 and a substantial portion of the surfaces of the perimeter region 19 on the secondary end 14 for the purpose of retaining heat energy within the chamber volume 11 to improve performance and fuel economy.

The heat absorbed by the combustion chamber apparatus 10 passes slowly through the layer of thermally insulating material 26A and 26B whereupon the heat then conducts nominally throughout the engine. The heat is then conducted into the inducted air and exhausted gasses and is ultimately carried away by the exhausted gasses, eliminating the need for a discrete heat energy exporting apparatus within the engine.

The combustion-resistant thermally insulating material 26A and 26B comprises a 3 mm thick layer of iron alloy containing 60 percent iron and 40 percent nickel, with comparatively low thermal conductivity of 10 W/m K at 200 degrees C., as a cost-effective thermally insulating layer adjoined to support structures 27A and 27B made of aluminum with comparatively high thermal conductivity of 130 W/m K at 200 degrees C. in various embodiments.

The Insulated Pulse Engine

One application for the disclosed stratified combustion chamber is found in an internal combustion engine referred to herein as the "insulated pulse-combustion engine", sometimes abbreviated, "insulated pulse engine" or "IPC engine".

The insulated pulse engine is a reciprocating piston engine which addresses five pathways of non-productive energy export from internal combustion engines (thermal conduction, exhaust heat, exhaust pressure, exhaust pollution, and mechanical losses) to provide fuel economy that is improved over commercially available engines. The IP engine applies principle attributes of the Diesel engine (unthrottled induction and high compression ratio), of ceramic adiabatic engine prototypes of the early 1980s (thermal insulation), of current HCCI engine prototypes (isochoric heat addition), and of Ernest E. Chatterton's "Simplic" engine prototype (isobaric heat rejection).

Several key philosophies of the Chatterton Simplic engine prototype, as published by The Institution of Mechanical Engineers in the 1975 book entitled, "Some Unusual Engines", are reprised in various 2-stroke embodiments of the IPC engine, including what the book's author. L. J. K. Setright, termed a "hyper-expansion" cycle, induction preceding exhaustion, uniflow gas transfer, an aversion to supercharging, the absence of a cooling system, and high fuel economy.

The thermodynamic sequence of both the Chatterton Simplic engine and the IPC engine, known as the Humphrey cycle, provides opportunity for high thermal efficiency, however it also carries the penalty of comparatively low volumetric efficiency.

Compared with naturally-aspirated 4-stroke Diesel engines at full-throttle, a similarly displaced 2-stroke IPC engine at full-throttle can consume only a twelfth of the fuel each combustion event. This is based on the observation that HCCI prototype engines consume ¼ of the full-throttle fuel that similarly displaced Diesel engines consume each combustion event, and that only ⅓ of a piston stroke in the 2-stroke IPC engine applies to the compression cycle.

Compared with naturally-aspirated 4-stroke Diesel engines at full-throttle, a similarly displaced 4-stroke IPC engine at full-throttle can consume only an eighth of the fuel each combustion event. This is based on the observation that HCCI prototype engines consume ¼ of the full-throttle fuel that similarly displaced Diesel engines consume each combustion event, and that only ½ of a piston stroke in the 4-stroke IPC engine applies to the compression cycle. With this fuel consumption constraint, a 4-stroke IPC engine can produce ¾ of the horsepower that a 2-stroke IPC engine of similar displacement can produce. Pollution emissions characteristics of equivalently powered 2-stroke and 4-stroke IPC engines are comparable.

The 4-Stroke Insulated Pulse Engine

According to a 4-stroke embodiment of the IPC engine, as shown in FIGS. 1 through 4, BDC is 100 mm from TDC. This BDC specification is sometimes called the piston stroke. The cylinder bore diameter is 100 mm, the stratified distance is 12 mm from TDC, the combusting distance is 0.5 mm from TDC, the compression cycle begins 50 mm before TDC (BTC), and direct fuel injection initiates at 8 mm BTC and completes at or before 6 mm BTC. From the moment stratification begins until spark ignition occurs the transfer passageway 20 is used as a conduit to transfer air from the perimeter region 19 to the central region 18 for the purpose of reinforcing fuel stratification while creating tumble turbulence to mix fuel and air in the central region 18, wherein a compression ratio sufficient to promote a supersonic combustion wavefront, in combination with a fuel-air equivalence ratio maintained in the range of 0.40 to 0.80 in the central region 18 assures a rapid combustion reaction with defined supersonic flame wavefront which begins at the spark plug 25, which propagates outward through the central region 18, which expands into the transfer passageway 20, and which is uniformly consumed and concluded in the transfer passageway 20 no later than the combusting distance after TDC (ATC), with substantially no fuel permitted within the chamber volume 11 after this period, in an embodiment.

The maximum fuel quantity permitted per combustion event, called a full-throttle value and represented by an equivalence ratio of 0.80 within the central region, is limited by chamber volume 11 pressure and temperature levels which, when the maximum is exceeded, cause NOx pollutants to form which cannot be effectively scrubbed clean by emissions aftertreatment devices due to the unconventionally low temperature of combusted gasses during exhaustion, in an embodiment.

The minimum fuel quantity permitted per combustion event, called a half-throttle value and represented by an equivalence ratio of 0.40 within the central region, is limited by a lean flammability limit of the fuel which, when the minimum is not achieved, promotes the incomplete oxidation of fuel during combustion, creating pollutants which cannot be effectively scrubbed clean by exhaust emissions aftertreatment devices due to the unconventionally low temperature of combusted gasses during exhaustion.

The 4-stroke IPC engine comprises a sequence of cyclic events starting with a compression cycle and ending with an induction reversion cycle. The compression cycle can be described as beginning the instant the induction port apparatus 23 closes at 50 mm BTC and ending the instant spark ignition 25 is triggered at 0.5 mm BTC. A combustion cycle then begins and combustion ends quickly when the reaction is substantially consumed and concluded on or before 0.5 mm ATC. A conventional expansion cycle then begins, and it ends at 50 mm ATC when the secondary end 14 reaches the same distance from TDC that the secondary end 14 was positioned when the compression cycle began. In conventional internal combustion engines, including Otto and Diesel engines, combustion chamber gasses retain residual mechanical energy, in the form of pressure, at the end of the expansion cycle. Otto and Diesel engines expel this residual pressure to the exhaust duct. The IPC engine retains this residual pressure for application in the next cycle, called the hyper-expansion cycle.

The hyper-expansion cycle then begins at 50 mm ATC, and continues until the secondary end 14 reaches 100 mm BDC. By applying apparatus which permits variable exhaust port timing, the hyper-expansion cycle in the 4-stroke IPC engine is comprised of two sequential stages, the hyper-expansion stage followed by a blowdown reduction stage, each of which vary in duration from 0% to 100% of the hyper-expansion cycle, dependent on throttle position. The hyper-expansion stage, which extracts residual mechanical energy from combustion chamber gasses, is characterized by combustion chamber pressure remaining above 1 bar. The blowdown reduction stage, which allows gasses within the exhaust duct to flow back into the combustion chamber, opens the exhaust port when combustion chamber pressure drops below 1 bar to prevent the combustion chamber from developing a vacuum which would result in blowdown-type pumping losses at the start of the exhaust cycle. At full-throttle, the hyper-expansion cycle initially comprises a hyper-expansion stage for 100% of the duration, to 100 mm BDC, followed by a blowdown reduction stage for 0% of the duration, unchanged at 100 mm BDC. At ¾-throttle, the hyper-expansion cycle is first comprised of a hyper-expansion stage for 75% of the duration, to 88 mm ATC, followed by a blowdown reduction stage for 25% of the duration, to 100 mm BDC. At half-throttle, the hyper-expansion cycle initially comprises a hyper-expansion stage for 50% of the duration, to 75 mm ATC, followed by a blowdown reduction stage for 50% of the duration, to 100 mm BDC. At idle, the hyper-expansion cycle initially comprises a hyper-expansion stage for 0% of the duration, unchanged at 50 mm ATC, followed by a blowdown reduction stage for 100% of the duration, to 100 mm BDC.

An exhaust cycle then begins at 100 mm BDC and ends at 15 mm BTC when the exhaust port apparatus 24 closes, in an embodiment. An incidental compression cycle then begins, and then elastically rebounds and concludes when the induction port apparatus 23 opens at 15 mm ATC. An induction cycle then begins, and then ends at 100 mm BDC. An induction reversion cycle begins at 100 mm BDC, and then concludes at 50 mm BTC when the compression cycle begins, completing the 4-stroke IPC engine cycle.

The 2-Stroke Insulated Pulse Engine

According to a 2-stroke embodiment of the IPC engine which has a 100 mm piston stroke, as shown in FIGS. 5 through 17B, the compression cycle begins when the secondary end 14, also called the piston, reaches 33 mm BTC. The chamber volume 11 then transitions to become fuel-stratified when the piston reaches 12 mm BTC. Fuel can be direct-injected into the central region 18 from 8 mm BTC to 6 mm BTC. Fuel is constrained to, and becomes mixed within, the central region 18 using tumble-turbulence generated by inducted air surging inward from the fuel-devoid perimeter region 19. Fuel stratification, in conjunction with spark ignition 25 or other precision ignition method, permits throttling a locally-homogenous fuel-air equivalence ratio within the highly reactive range of 0.40-0.80 to assure a rapid, complete combustion reaction with practical torque band. A fuel-air equivalence ratio below 1.00 represents the deviation of a stoichiometric ratio toward fuel-lean.

In an embodiment, combustion initiates in close proximity to the central axis of the cylinder bore 12 at 0.5 mm BTC, propagates radially outward a short distance on a controlled supersonic wavefront, whereupon the reaction is efficiently consumed and concluded in the transfer passageway 20 on or before 0.5 mm ATC, assuring the entire fuel budget performs work on the piston through the full expansion cycle. Conventional expansion occurs from TDC until the piston travels 33 mm ATC. At full throttle, represented by the equivalence ratio 0.80, expansion then extends beyond convention (hyper-expansion) until the piston reaches 67 mm ATC, with the combustion chamber reaching 1 bar to extract all available combustion energy and eliminate the need for a cooling system The chamber volume 11 then develops a vacuum while the inlet ports open, drawing fresh inducted air into the bottom of the single region 21 from 67 mm ATC until 100 mm BDC. At 100 mm BDC, induction ends, exhaustion begins, and the piston begins quietly exhausting oxygen-rich combusted gasses residing in the upper 67 mm of the chamber volume 11, leaving mostly fresh inducted air within the combustion chamber when the piston reaches 33 mm BTC. The cycle then repeats.

Conventional exhaust emissions aftertreatment devices are not effective at scrubbing pollutants from the comparatively cool, pressureless exhaust gasses that the piston pushes out of the chamber volume 11. The IPC engine prevents the formation of pollutants by constraining fuel to a tumble-turbulent, thermally-insulated, crevice-free region of the combustion chamber specifically shaped (only at TDC) to support clean combustion. Rather than using brittle ceramic thermal insulators, as was the practice in the ceramic adiabatic engine experiments of the early 1980s, the IPC engine contains two thermally-insulating Fe60Ni40 alloy iron disks, one integrally cast into the piston, the other into the primary end 13, also called the cylinder head, to prevent the formation of quench-sourced pollutants. These thermally-insulating disks also promote rapid warm-up of the combustion chamber which minimizes cold-start forms of pollution emissions, and they help retain combustion heat in the chamber volume 11 to improve performance and fuel economy.

Volumetric Efficiency and Fuel Efficiency

Modern Otto and Diesel engines operate at high volumetric efficiency. To this extent they introduce fuel energy into the engine at a high rate. They transfer this fuel energy at high rate productively to the flywheel and at high rate to five nonproductive energy exporting pathways.

The IPC engine operates at low volumetric efficiency, such that it introduces fuel energy into the engine at a low rate. It transfers this fuel energy at low rate productively to the flywheel and at low rate to five nonproductive energy exporting pathways.

Whether it is more fuel-efficient in a given application to transfer fuel energy at a high rate using a small displacement Otto or Diesel engine or at a low rate using a large displacement IPC engine is dependent on construction detail and operating conditions. The energy equations differ between these two approaches and one method can be more fuel-efficient than the other.

Elements of Energy Efficiency

Energy efficiency in an internal combustion engine is determined by the ratio between the rate at which heat energy is kinetically transferred to the flywheel and the rate at which fuel energy is introduced into the engine, with the arithmetic difference representing fuel energy lost to five nonproductive energy-exporting pathways. A yardstick used for measuring energy efficiency in an internal combustion engine is called "brake specific fuel consumption", abbreviated BSFC, and is often dimensioned in terms of grams of fuel consumed per kilowatt hour (g/(kW*h)) of work performed. The lower the BSFC number, the more energy efficient the engine is. Energy loss in an internal combustion engine can be managed by tending five efficiencies:

1. High "insulation efficiency" minimizes loss of combustion energy to a cooling system in the form of heat, and is driven by the thermal conductivity of the combustion chamber. If maximizing fuel efficiency is the primary goal, and if excessive heat is lost to a cooling system, the insulation efficiency should be improved. If improved insulation efficiency causes the combustion chamber material to overheat and fail, the average temperature of combustion chamber gasses through a full engine cycle should be reduced.

2. High "combustion efficiency" minimizes loss of combustion energy to the exhaust duct in the form of elevated exhaust temperature, and is driven by compression ratio, ignition timing, and combustion duration. If maximizing fuel efficiency is the primary goal, and if the temperature of combusted gasses is excessive at the end of the expansion cycle, the combustion efficiency should be improved.

3. High "expansion efficiency" minimizes loss of combustion energy to the exhaust duct in the form of elevated exhaust pressure, and is driven by the expansion ratio. If maximizing fuel efficiency is the primary goal, and if the pressure of combusted gasses is excessive at the end of the expansion cycle, the expansion efficiency should be improved.

4. High "emissions efficiency" minimizes loss of fuel energy to the exhaust duct in the forms of either insufficiently combusted fuel or excessively combusted fuel. Insufficiently combusted fuel refers to incomplete oxygenation, excessive combustion refers to the overheating of combustion chamber gasses such that compounds of nitrogen form. If maximizing fuel efficiency is a primary goal, combustion should be constrained to promote only the desired chemical reactions.

5. High "mechanism efficiency" minimizes loss of combustion energy to mechanical component friction, to fluid pumping losses, and to vibration within the engine. Mechanism efficiency is a lesser consideration in Otto and Diesel engines that exhibit high cooling and exhaust system energy losses, but mechanism efficiency plays a dominant role in determining the fuel-efficiency of the IPC engine. Mechanical component friction can include piston skirt sliding friction, compression ring sliding friction, friction bearing losses, fluid seal friction, and elastic spring losses. Fluid pumping losses can include blower pumping, compressor pumping, fuel pumping, lubricant pumping, crankcase windage, induction throttling, induction blowdown, induction flow resistance, exhaustion blowdown, and exhaustion flow resistance. Vibration losses can include external engine vibration resulting from rotating and reciprocating components within the engine, and crankshaft resonance damping.

Some forms of mechanical friction correlate more closely with generated horsepower than to cylinder displacement. A larger displacement engine need not always indicate greater friction than a smaller displacement engine. Included in this realm is piston skirt sliding friction, since sliding friction is low when average combustion chamber pressure is low. Skirt friction can be additionally reduced through application of a high connecting rod ratio. Since the average combustion chamber pressure of the IPC engine is unconventionally low, piston sliding friction can be further reduced by combining low tension compression sealing rings with gas ported pistons. Gas ported pistons tend to be impractical in production engines due to the issue of fuel clogging the ports and crevice-sourced pollution emissions, however, due to fuel stratification in the IPC engine, fuel can neither clog piston gas ports nor can it generate crevice-type pollutants.

Cooling System Efficiency Losses

Insulation efficiency is low in Otto and Diesel engines because a cooling system is incorporated to quickly remove heat energy absorbed by combustion chamber metals after each combustion event. This removal is necessary, since chamber metals would otherwise attain the average temperature of the combustion chamber gasses, a temperature too hot for sustainable engine operation. Heat energy conducted through thermally conductive combustion chamber metal into the cooling system represents a significant loss of fuel energy which would otherwise be available to drive the crankshaft.

Following the oil crisis of 1979, internal combustion engine manufacturers around the world began developing "ceramic adiabatic engine" prototypes which contained thermally insulated ceramic combustion chambers in an attempt to improve engine thermal efficiency without sacrificing volumetric efficiency. Thermally insulating the combustion chamber reduced, and sometimes eliminated, the need for a cooling system, thus retaining a larger fraction of combustion heat energy for mechanical work output. Unfortunately, to retain volumetric efficiency while simultaneously minimizing mechanical shock loading of the brittle ceramic insulators, these adiabatic engines were designed to combust with a conventional low heat release rate. The portion of fuel combusting later in the expansion cycle expands at a lower effective compression ratio than the fuel which combusts near TDC. The latter combusting fuel, in combination with thermal insulation, resulted in the superheating of combustion chamber gasses before expulsion into the exhaust duct. Ceramic adiabatic engines evolved to emphasize exhaust energy recovery through turbocompounding and other post-processing methods, but only a fraction of the exhaust energy could be recovered.

Ceramic adiabatic engines provided slightly improved fuel efficiency over Otto and Diesel engines, but they operated under the most brutal conditions and could not be made practical for commercial application.

The use of ceramic thermal insulators, or the use of any thermally insulating material, in the combustion chamber of internal combustion engines for the primary purpose of improving fuel economy in vehicles has found minimal interest in the industry since the conclusion of these experiments.

Exhaust System Efficiency Losses

Exhaust System Efficiency Comprises Two Components: Combustion Efficiency and Expansion Efficiency.

Combustion efficiency is low in Otto, Diesel, and ceramic adiabatic engines because combustion is engineered to progress gradually, beginning near TDC and continuing well into the expansion cycle. This low heat release rate allows a lot of fuel to gradually burn without exceeding the pressure limits of the combustion chamber. Volumetric efficiency is high because the piston experiences high levels of combustion pressure through a significant portion of the expansion cycle. Thermal efficiency is low because the late burning fuel effectively combusts at a low compression ratio, causing large amounts of fuel energy to be expelled into the exhaust duct in the form of heat. As a contrast, HCCI engine prototypes and the IPC engine combust all fuel near TDC and none during the expansion cycle, allowing combusted gasses to adiabatically cool through the entire expansion cycle.

Expansion efficiency is low in Otto, Diesel, and ceramic adiabatic engines because the compression process and expansion process are conveniently of equal stroke length, a length optimized only for compression, resulting in signification combustion pressure kinetic energy being released to the exhaust duct in the form of blowdown losses, when the exhaust port opens, before the kinetic energy can perform work on the piston. It should be noted that the compression cycle and the expansion cycle are independent functions and will seldom be of equal length in an engine optimized for high fuel economy. As a contrast, Atkinson engines, which are found in some of today's most fuel efficient vehicles, extend the expansion cycle slightly beyond that of the compression cycle to utilize a greater share of available combustion pressure. Both the Chatterton Simplic engine and the IPC engine extend the expansion cycle significantly beyond that of the compression cycle to utilize all available combustion pressure.

HCCI and Atkinson engines both release less heat and pressure energy to the exhaust than do equivalently powered Otto, Diesel, and ceramic adiabatic engines. Taken to the next level, the Chatterton Simplic engine and the IPC engine both release less heat energy and less pressure energy to the exhaust stream than do any of the five aforementioned engines.

Exhaust Emissions

Gasoline, propane, ethanol, methanol, ammonia, or other fuels can be applicable to the IPC engine. Exhaust emissions resulting from the combustion of fuel comprise both desirable (non-toxic) and undesirable (toxic) components. Desirable components of exhaust emissions comprise carbon dioxide ($CO_2$) and water ($H_2O$), and result when fuel is fully combusted under ideal conditions. In the unique case of ammonia ($NH_3$) fuel, the desirable components of exhaust emissions comprise nitrogen ($N_2$) and water ($H_2O$) under ideal conditions.

Undesirable components of exhaust emissions traditionally associated with internal combustion engines fall into four simplified categories:

1. Unburned hydrocarbon (UHC) exhaust emissions can form when fuel is in proximity of combustion chamber crevices such as are found near the head gasket, upper piston ring, piston ring gas ports, and intake valve seat.

2. Soot emissions, also known as particulate matter (PM) exhaust emissions, which represent fuel that is ⅓ combusted, can form when fuel is direct injected into the dense flame kernel of a compression ignition engine which has already consumed all adjacent oxygen.

3. Carbon monoxide (CO) exhaust emissions, which represent fuel that is ⅔ combusted, can form when fuel is combusted near chilled surfaces within the combustion chamber, or when oxygen has been depleted due to an excessive level of exhaust gas recirculating into the inducted air stream.

4. Oxides of nitrogen (NOx) exhaust emissions, which represent fuel that is overcombusted can form when heat energy becomes unproductively high in the combustion chamber and the very stable 3-bond nitrogen molecule in air breaks apart.

The cause of exhaust pollution in internal combustion engines is complex but well understood, as are exhaust processing methods which remove pollutants, and as are clean combustion methods which prevent the formation of pollutants.

Basic Description of the Insulated Pulse Engine

The IPC engine is a reciprocating piston internal combustion engine which applies unthrottled air induction, precision spark ignition, direct fuel injection, high compression ratio, and the following four unconventional functions, to achieve high thermal efficiency:

Unconventional Function #1—Rapid "pulse" combustion (like an HCCI engine).

Unconventional Function #2—Thermally insulated combustion chamber (like a ceramic adiabatic engine).

Unconventional Function #3—Hyper-extended expansion cycle (like a Chatterton Simplic engine).

Unconventional Function #4—Fuel-stratified combustion chamber.

The resulting engine of the present subject matter can run cool without a cooling system, can function quietly without a muffler, can combust cleanly without a catalytic converter, and exhaust gasses can be sufficiently cool and pressureless that exhaust ducting can be made of plastic.

Unconventional Function #1—Rapid "Pulse" Combustion

In the IPC engine, combustion initiates near TDC and is rapidly consumed near TDC, providing a combustion reaction with low volumetric efficiency and high thermal efficiency. The volumetric efficiency is low because a comparatively small amount of fuel will generate sufficient temperature and pressure near TDC to reach the limits which do not form NOx exhaust pollutants. Thermal efficiency is high because the entire fuel budget combusts at TDC and presses upon the piston through the entire expansion cycle, greatly reducing the percentage of heat energy available to the exhaust and lowering the average temperature of the combustion chamber. The ordinary methods used to achieve a high heat release rate are:

1. High compression ratio
2. Stratified combustion chamber locally shaped to fully support efficient combustion
3. Stratified fuel-lean equivalence ratio calibrated for rapid, complete reaction
4. Fuel-air charge turbulently mixed prior to ignition
5. Combustion chamber turbulence present at time of ignition
6. Spark ignition precisely controls the combustion envelope
7. Thermally insulated combustion chamber reduces quenching of reaction
8. Additional turbulence generated during combustion assists complete reaction While the rate of pressure rise (dP/dt) during combustion is unconventionally high (>50 bar rise per crank angle degree vs.<10 bar/CAD in an Otto or Diesel engine), the IPC engine does not generate unusually high cylinder pressure, as there is an insufficient quantity of fuel in the combustion chamber during each combustion event to generate excessive pressure. Pressure and temperature limits in the IPC engine's combustion chamber are not driven by structural limits, but are driven by the need to prevent the formation of NOx pollutants during combustion. If temperature and pressure in the combustion chamber climb sufficiently high that the very stable 3-bond nitrogen molecule breaks apart and forms NOx pollution emissions, then injected fuel volume should be readjusted below NOx-producing levels.

The rapid rate of pressure rise in the combustion chamber of the IPC engine is the result of a controlled supersonic combustion wavefront which generates significantly more shockwave noise energy than the subsonic combustion wavefront in an Otto or Diesel engine. The predictable combustion wavefront in the IPC engine will generate significantly less structural excitation noise than the unpredictable detonation reaction in HCCI engine prototypes. Detonation reaction noise is a recognized problem in HCCI engines, but due to the predictable nature of the IPC engine's combustion wavefront, due to the predictable centralized location of the iron-shrouded reaction, and due to the fact that only ⅓ of the fuel is present in the IPC engine's full-throttle combustion reaction when compared to a full-throttle HCCI reaction, combustion noise generation can be managed.

Unconventional Function #2—Thermally Insulated Combustion Chamber

The IPC engine thermally insulates the combustion chamber fully when the piston is at TDC. It continues to partially insulate the combustion chamber as the piston drops away from TDC. Three reasons for insulating are: 1) to burn cleanly at TDC by assuring critical combustion chamber surfaces quickly flash to higher temperatures during compression and combustion to prevent the formation of quench-type exhaust emissions, 2) to bring combustion chamber surfaces up to operating temperature quickly at cold engine start-up to minimize exhaust pollutants commonly associated with cold engine starts, and 3) to increase thermal efficiency by minimizing heat energy loss to a cooling system during the hottest portion of the compression and expansion cycles, The combustion chamber is not fully insulated when the piston drops from TDC in order that lubricated cylinder bore surfaces can quickly dissipate friction heat generated by direct contact with compression sealing rings.

The full extent of combustion-resistant thermally insulating material in an embodiment of the IPC engine is the piston contains a 3 mm thick nickel-iron alloy insulating disk 26B and the cylinder head contains a 3 mm thick nickel-iron alloy insulating disk 26A. One of these investment cast insulators is pre-inserted into the die cast mold of an aluminum piston, the other is pre-inserted into the mold of a cast aluminum cylinder head.

The preferred combustion-resistant thermally insulating material in the IPC engine's combustion chamber is an iron alloy containing 40% nickel, with thermal conductivity of 10 W/m K at 200 degrees C. As a comparison, the thermal conductivity of cast A356-T6 aluminum is 130 W/m K at 200 degrees C., with conventional thermal gradient distance of 10 mm between combustion chamber and cooling system, and compacted graphite iron (as specified in ASTM A8421 is 40 W/m K at 200 degrees C. with conventional gradient distance of 5 mm.

A ceramic popular in the adiabatic engine prototypes of the 1980s, with thermal conductivity of 2 W/m K and known as "partially stabilized zirconia" (PSZ), can be a thermal insulator in one embodiment of the IPC engine. PSZ ceramic was not sufficiently durable in the adiabatic engine experiments to become commercially applicable, though it performed remarkably well considering the severity of the application.

Other combustion resistant thermally insulating materials can be used in the IPC engine. As a lowest-cost limit for practical insulation, compacted graphite iron can be effective as a thermal insulator.

Unconventional Function #3—Hyper-Extended Expansion Cycle

The IPC engine incorporates a hyper-extended expansion cycle, which resembles an Atkinson engine and which matches a Chatterton Simplic engine, to let combustion energy perform additional motive work before being discharged to the exhaust. The extended expansion cycle further reduces average combustion chamber temperature and pressure, bringing the average combustion chamber temperature down to the level where a cooling system is not required at all. The Chatterton Simplic engine claims a 60:1 static expansion ratio (which includes the induction cycle) while the IPC engine claims a 36:1 dynamic expansion ratio (which excludes the induction cycle), effectively describing the same specification in two different ways.

Otto and Diesel engines have, perhaps unfortunately, evolved such that the compression and expansion cycles are matched in stroke length. The compression cycle and the expansion cycle are each driven by significantly different processes and mathematical equations, and their stroke lengths will seldom coincide if maximized fuel economy is the primary goal. An embodiment of the 2-stroke IPC engine's compression cycle is one third of a piston stroke and the expansion cycle is two-thirds of a piston stroke. An embodiment of the 4-stroke IPC engine's compression cycle is half of a piston stroke and the expansion cycle is a full piston stroke.

Regardless of which fuel is selected, the hyper-expansion ratio in the IPC engine will tend toward 36:1 to minimize heat energy loss to the exhaust duct, in the same way the Chatterton Simplic engine minimized exhaust energy loss. The selection of 36:1 for the expansion ratio is based on the assumption that an arbitrary (a.k.a.: currently unknown) peak combustion chamber pressure of 150 bar at TDC is at the threshold which will not form oxides of nitrogen pollutants, and on the prevalence of predominantly diatomic gasses of the fuel-lean combusted charge obeying, to a first order approximation, the 150 bar/(36^1.4)=1.0 bar equation, where 1.4 represents the isentropic expansion factor of a diatomic gas. The IPC engine inducts unthrottled air, much like a Diesel engine, and it adiabatically pre-warms the inducted charge during compression to a temperature level below the auto-ignition temperature of the fuel-air mixture, but to a temperature level which is sufficient to promote rapid, controlled combustion when precision spark ignition is introduced near TDC. With a 36:1 expansion ratio and an 18:1 compression ratio of the presently described construction, ammonia would be a preferred fuel. With the nominal compression ratio adjusted to 16:1, propane would become a preferred fuel. Other fuels will have lower compression ratios, such as 14:1 for ethanol, and 10:1 for gasoline.

Unconventional Function #4—Fuel-Stratified Combustion Chamber

Two issues exist with the combustion process described above in the basic description of the IPC engine:

1) Complete full-throttle combustion which combines a thermally efficient compression ratio with a non-stratified stoichiometric mix of fuel and air generates destructive pressure levels if all fuel is combusted at TDC. As demonstrated in HCCI prototype engines which use gasoline as the fuel, a fuel-lean equivalence ratio of no more than 0.25 prevents excessive combustion chamber pressure when all fuel combusts at TDC. Full-throttle equivalence ratios in this low range approach "lean flammability limits" and combust incompletely, generating significant exhaust pollutants. Partial-throttle equivalence ratios in HCCI engines drop below 0.15 and can become too lean to combust.

2) With homogenously mixed combustion reactions, there exist stagnant "quench" locations in the combustion chamber which don't support efficient combustion, yet which contain fuel and air. Examples of these locations include the tiny crevice volume between the O.D. of the piston and I.D. of the cylinder bore above the compression sealing rings, and also at the segment of the head gasket exposed to the combustion chamber. Significant UHC pollution is created in these tiny locations of a homogenously inducted combustion chamber, but because the IPC engine has unconventionally cool exhaust gas temperatures the IPC engine is unable to use exhaust emissions aftertreatment devices which would otherwise scrub away this pollution.

The IPC engine resolves both the "lean flammability" problem and the "quench location" problem by stratifying the combustion chamber into two regions just prior to direct fuel injection.

With a 100 mm piston stroke, an embodiment of the IPC engine's combustion chamber is stratified only when the piston is located within 12 mm, or 30 crankshaft degrees, of TDC. When the piston is more than 12 mm from TDC there is only a single region in the chamber. The stratified combustion chamber forms when the piston is at 12 mm BTC, segregating into two regions, one is named a perimeter region 19 which contains air and actively rejects fuel, and the other is named a central region 18 which also contains only air when the chamber forms, but which is optimized beginning at 8 mm BTC to turbulently mix this air with direct-injected fuel in order to combust cleanly.

A transfer passageway 20, which can be annular, also forms at 12 mm BTC to communicate between the two regions, transferring air toward the central region 18 as the piston travels from 12 mm BTC to TDC and transferring fully combusted gasses to the perimeter region 19 as the piston travels from TDC to 12 mm ATC. The transfer passageway 20 additionally acts as a buffer to support and contain the expanding combustion reaction when the piston is within 0.5 mm of TDC.

The stratified combustion chamber becomes optimally shaped for clean, fast combustion only when the piston is within 0.5 mm of TDC. A precisely timed and located source of ignition, as a spark ignition can provide, is used to assure combustion initiates and concludes precisely within this positional constraint.

As the combusting reaction heats up within 0.5 mm of TDC, the gasses expand beyond the central region 18. The combusting gasses efficiently spill into the thermally insulated transfer passageway 20, which fully supports combustion just like the central region 18, while pure air already residing within the transfer passageway 20 is pushed, in laminar fashion, into the perimeter region 19 which does not support efficient combustion. Only when the piston falls to 0.5 mm ATC can expanding combusted gasses reach the perimeter region 19. By this time the combustion reaction has substantially concluded and there is no concern for pollution development in creviced chamber locations.

The perimeter region actively keeps fuel away from combustion chamber features which do not efficiently support combustion. The volume of the perimeter region effectively approaches zero as TDC approaches, whereas the volume of the central region effectively approaches a finite value as TDC approaches, effectively creating an air surge directed from the perimeter region toward the central region during the last 12 mm BTC. The perimeter region actively pumps this air toward the central region to reinforce stratification and to turbulently mix injected fuel with air prior to ignition. Direct fuel injection begins when the piston is 8 mm BTC and ends by 6 mm BTC, and is aimed to inject fuel mass only into the central region. The air pumping action constrains fuel to the central region, permitting selection of an optimal fuel-air equivalence ratio in the range of 0.40 to 0.80 which combusts rapidly and cleanly, rather than the pollution-prone equivalence ratio range of 0.15 to 0.25 commonly found in HCCI engine prototypes.

The central region 18 and transfer passageway 20 are both shaped to fully support combustion, in that the surface areas are comparatively low to minimize quenching of the combustion reaction. The thermally insulated chamber surface heats up quickly during compression and combustion to assure fuel in close proximity to the insulated material combusts fully. During compression, the central region 18 is shaped to generate within itself a tumbling vortex as air surges inward from the perimeter region 19, assuring all fuel is in motion to uniformly combust, the turbulence mixing fuel and air uniformly while minimizing both hot and cold spots throughout the central region 18, minimizing both pre-ignition and pollution issues.

The rate of the combustion reaction is driven, in part, by the selected fuel, the compression ratio, the fuel-air equivalence ratio, chamber turbulence, and engine RPM, and requires sufficient time to burn completely and cleanly. The reaction rate defines an engine RPM maximum which, if exceeded, will result in incomplete combustion and pollution emissions. Any residual fuel that is not completely combusted when the piston falls to 0.5 mm ATC is subject to exit the combustion chamber as a pollutant. Due to the lean flammability limits of fuel, there is not a second opportunity to combust fuel that does not initially combust near TDC. If pollutant generation is to be low, quench features, such as conventional spark plug insulation recesses, should be avoided in the central region or transfer passageway.

The fuel-stratified combustion chamber uniquely allows pollution-free application of gas-ported piston rings which can minimize sliding friction during the low-pressure segment of the engine cycle. This improves fuel economy and minimizes port window interface wear.

Construction Summary of the 2-Stroke Insulated Pulse Engine

Figure 6:
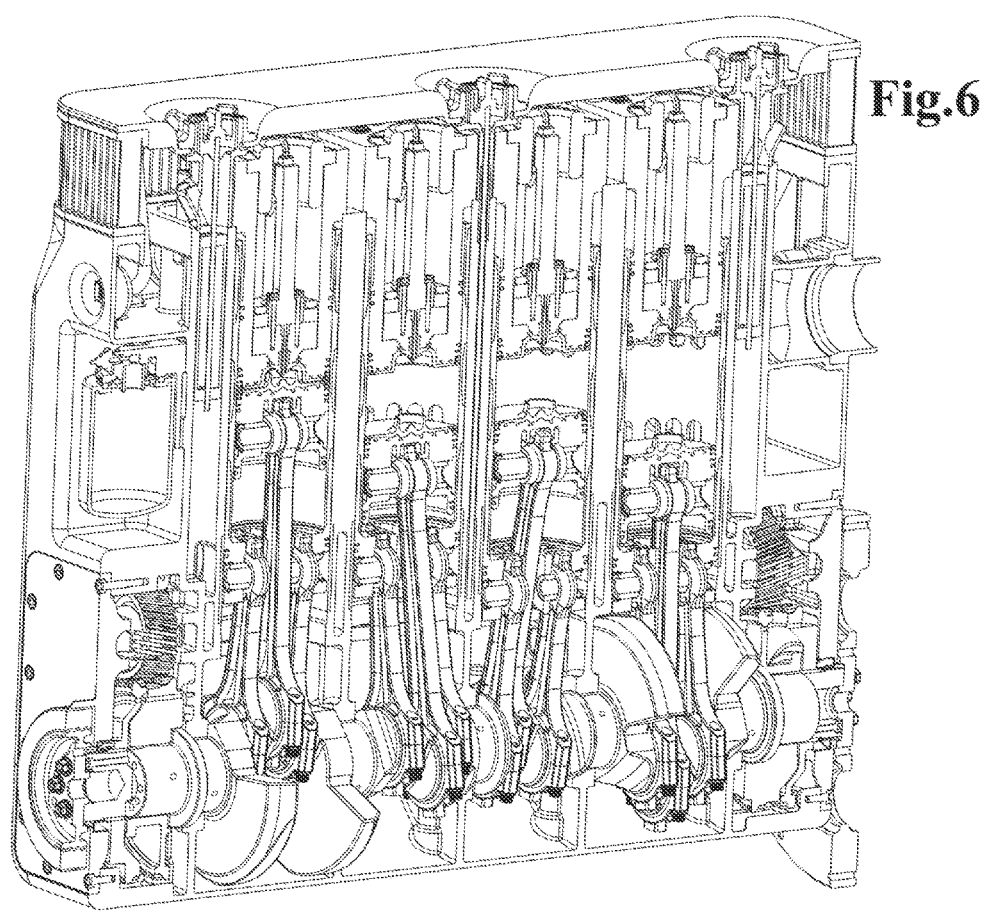
FIG. 6 is a cutaway view of an embodiment of the 2-stroke insulated pulse engine.

The 2-stroke IPC engine, as shown in the FIG. 6 cutaway view, is a reciprocating piston engine developed around a 3.2 liter inline 4-cylinder platform with 100 mm bore and 100 mm stroke and 90-degree firing interval. A crankshaft counterbalance scheme compensates for both rotating and reciprocating mass. The reciprocating assembly, as shown in the FIG. 7 cutaway view, encloses each piston within a ported reciprocating cylinder, the reciprocating cylinder also joined to the crankshaft using connecting rods. The piston and reciprocating cylinder coordinate to provide induction and exhaustion functions for the combustion chamber. In FIGS. 8A and 8B, which show two orientations of one cutaway view, the reciprocating assembly is shown installed into a cylinder block 31 containing a ported fixed cylinder 28, an integral induction plenum 29, and an integral exhaustion plenum 30.

Piston Assembly

The piston assembly of the IPC engine, as shown in FIG. 9, is comprised of a thermally insulated piston, a connecting rod 17, and conventionally associated components.

The piston contains an investment-cast combustion-resistant thermally insulating nickel-iron alloy disk 26B which is cast integrally with the aluminum piston 27B. The nickel-iron alloy disk 26B comprises the combustion chamber surface of the piston, with the function of minimizing the formation of quench-sourced pollution emissions, minimizing cold-start forms of pollution emissions, and minimizing combustion chamber heat lost during compression and combustion. The aluminum body of the piston provides a thermally conductive pathway for the small amount of combustion heat which escapes through the thermal insulator to quickly dissipate into the engine assembly, where the dissipated heat is eventually carried away by induction air and unconventionally cool exhaust gasses.

The piston assembly contains a set of rings near the compression end which manage combustion pressure sealing and ring lubrication, and a set of rings near the crankcase end which manage crankcase vacuum sealing and ring lubrication. The crankcase end ring set is lubricated, in part, by immersion in oil thrown from the rotating crankshaft. Since the crankcase end ring set is shrouded from much of the thrown oil by the reciprocating cylinder assembly, ring oiling is supplemented through a metered passageway within the piston which transfers pressurized crankshaft oil via the connecting rod. Lubricating oil is metered from the crankcase end ring set to the compression end ring set via positional overlap within the bore during the course of a full engine cycle. Oiling requirements for the compression end ring set is reduced from convention because the cylinder bore never contacts combustion flame. To reduce pumping losses created by crankcase windage, particularly windage between the piston and reciprocating cylinder, the crankcase is kept at a significant level of vacuum using a crankcase vacuum pump.

The sealing rings near the compression end travel across a band of twelve induction ports in the reciprocating cylinder. To prevent wear caused by introduction of the ends of the rings to the unsupported space of a port window, the rings can be pinned in the piston grooves, allowing them to float in position within the groove without being allowed to rotate in the bore, keeping ring ends away from port windows.

The piston can incorporate a gas-ported type of sealing ring, since fuel does not approach the perimeter region of the combustion chamber occupied by sealing rings or gas ports, and therefore fuel cannot clog the ports and pollution emissions cannot form within the gas ports. Gas ports permit the use of low-tension compression sealing rings which reduce sliding friction when combustion chamber pressure is low, improving fuel economy and minimizing port window interface wear.

Reciprocating Cylinder Assembly

The cylinder bore 12, sometimes called the reciprocating cylinder assembly or the sleeve valve assembly, as shown in FIG. 10, is comprised of a reciprocating cylinder, two connecting rods, plus components conventionally associated with a piston assembly. The reciprocating cylinder assembly is connected to the crankshaft through two connecting rods, and the crankshaft journals are located such that the stroke and phase angle of the cylinder is not matched with piston motion. In an embodiment, the reciprocating cylinder, with a bore of 100 mm and an O.D. of 114 mm, has a 60 mm stroke, with the journal's phase angle retarded 35 crankshaft degrees from the piston.

The reciprocating cylinder assembly contains two circumferential bands of twelve ports, the band nearer the primary end 13 provides exhaustion, the band nearer the crankcase end provides induction.

In an embodiment, the reciprocating cylinder is made of a cast iron, as cast iron is durable, low in cost, high in lubricity, and absorbs less heat energy from combusted gasses than would a hypereutectic aluminum reciprocating cylinder. Since a cast iron reciprocating cylinder is heavy, a composite cylinder can contain a cast iron sleeve surrounded by a lightweight aluminum sheath. An aluminum sheath provides a second benefit, in that it can quickly carry heat away from the portion of cast iron which absorbs compression and combustion heat.

The reciprocating cylinder is constrained at the crankcase end by the OD, and at the cylinder head by the ID. The crankcase end OD measures 114 mm to provide positional constraint within the cylinder block 31, the remainder of the reciprocating cylinder is stepped down to 113 mm at the OD to provide a clearance between the reciprocating cylinder and the fixed bore of the cylinder block 31. This clearance is large enough to prevent scuffing of the reciprocating cylinder against the cylinder block 31, and small enough to prevent significant port leakage.

The reciprocating cylinder contains a set of rings at the crankcase end which manage crankcase vacuum sealing while assuring the reciprocating cylinder OD will have a lubricating film of oil near the crankcase end to prevent wear of the cylinder block bore 28. The set of rings at the crankcase end can be calibrated for low friction through the full engine cycle.

The reciprocating cylinder additionally slides against a set of sealing rings contained by the piston, and against another set of sealing rings contained by the head. Both of these latter ring sets seal against high combustion pressures, and therefore will generate notable friction when sealing combustion pressure. The reciprocating piston has a 100 mm stroke, the reciprocating cylinder a 60 mm stroke which is phase-angle shifted from the piston. The result is the piston rings actually slide only 60 mm within the reciprocating cylinder, and the head rings slide 60 mm within the reciprocating cylinder, generating 120 mm of total compression ring travel per half engine cycle.

Crankshaft Assembly

The crankshaft assembly, as shown in FIG. 11, consists of a nodular iron crankshaft containing five main bearings and a counterbalance assembly. The central main bearing also comprises a thrust bearing function. Each cylinder position on the crankshaft contains three bearing journals, a central journal to attach the piston assembly flanked by a pair of journals to attach the reciprocating cylinder assembly. The crankshaft is fully drilled for pressure-oiling twelve connecting rods.

Balance compensation for both rotating mass and reciprocating mass is included with the crankshaft assembly. The rotating mass is compensated by a portion of conventional counterweights at each end of the crankshaft, and reciprocating mass is compensated by the remainder of counterweight mass combined with a concentric reverse-spinning counterweight at each end of the crankshaft.

Cylinder Block Assembly

The cylinder block assembly, as shown in FIG. 12, is comprised of a cylinder block 31, a maincap block 32, a front panel 33, a rear panel 34, and conventional components associated with a cylinder block assembly. The volume of the cylinder block assembly below the cylinder block, above the maincap block and between the front panel and rear panel, is called the crankcase volume, or crankcase.

The cylinder block casting contains four fixed cylinder block bores 28, each having two circumferential bands of twelve ports each, and an additional band of eight ports. The band of eight ports is nearest the deck (top) surface and is included for incidental venting 35. The band of twelve ports nearest the crankcase is for induction 36, and the middle band of twelve ports is for exhaustion 37.

The cylinder block 31 is designed to contain four reciprocating cylinders within its four fixed cylinder bores. These reciprocating cylinders each have sealing/oil control rings contacting the fixed bore nearest the crankcase end, with the reciprocating cylinders only contacting the fixed bores nearest the crankcase end. The fixed bores are constructed to handle the associated sliding friction of the reciprocating cylinders. The cylinder block 31 can be constructed entirely of a hypereutectic aluminum alloy to support the reciprocating cylinders, but a lower cost method can be to cast cylinder liners into a non-hypereutectic aluminum block, the integrally-cast inserts permitting specific wear-resistant cylinder sleeves at appropriate positions within the block.

The cylinder block 31 has four enclosed levels positioned above the crankcase volume:

1) The uppermost enclosed chamber is the incidental venting plenum 38 which provides incidental mechanism venting specific to this embodiment. This level also provides two entryway ports at the top which enable filtered ambient air to be drawn into the cylinder block 31.

2) The second enclosed chamber from the top is an exhaust plenum 30 which collects combusted gasses ejected by each chamber volume 11 as the exhaust ports 24 open, and which directs exhaust gasses at low-restriction toward an exhaust flange exiting the cylinder block 31.

3) The third enclosed chamber from the top is an induction plenum 29 which draws fresh filtered air entering the incidental venting plenum 38 of the cylinder block 31, air which traverses the exhaust plenum 30 at four corner passageways, providing low-restriction filtered ambient air as the induction ports 23 open and draw filtered air into the chamber volume 11.

4) The fourth enclosed chamber from the top is the recirculating oil reservoir 39 for the engine.

Cylinder Head Assembly

Figure 13:
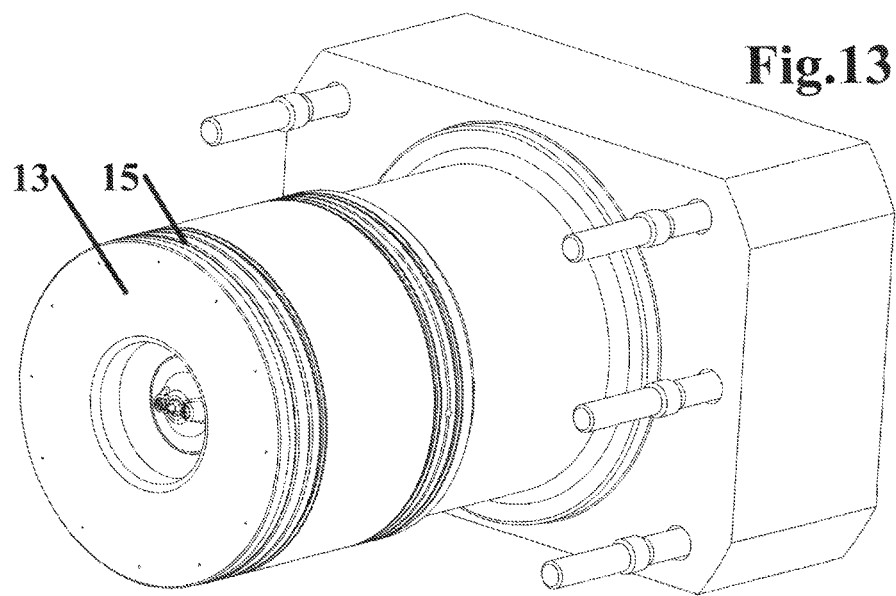
FIG. 13 shows an embodiment of a primary end assembly, sometimes called a head assembly, for the insulated pulse engine.

In an embodiment, the IPC engine runs a separate cylinder head assembly for each combustion chamber. The cylinder head assembly, as shown in FIG. 13, contains an investment-cast combustion-resistant thermally insulating nickel-iron alloy disk 26A which is cast integrally with the aluminum head. The nickel-iron alloy disk 26A comprises the combustion chamber surface of the cylinder head, with the function of minimizing the formation of quench-sourced pollution emissions, minimizing cold-start forms of pollution emissions, and minimizing combustion chamber heat lost during compression and combustion. The aluminum body of the cylinder head provides a thermally conductive pathway for the small amount of heat which escapes through the thermal insulator to quickly dissipate into the engine assembly, where the dissipated heat is eventually carried away by induction air and unconventionally cool exhaust gasses.

The cylinder head assembly contains a primary set of rings 40 positioned near the primary end 13 of the head casting which manage combustion pressure sealing, and a secondary set of rings 41 positioned further from the primary end 13 which manage pressurized oil to prevent scuffing as the reciprocating cylinder's bore slides against the head. The travel path of the secondary set of rings 41 overlaps the travel path of the primary set of rings 40, providing a controlled volume of lubricating oil to the reciprocating cylinder. The cylinder head connects to a crankcase vacuum passageway which is present to continually draw oil from the cylinder head and return it to the sump.

Spark Plug and Coil

Figure 14:
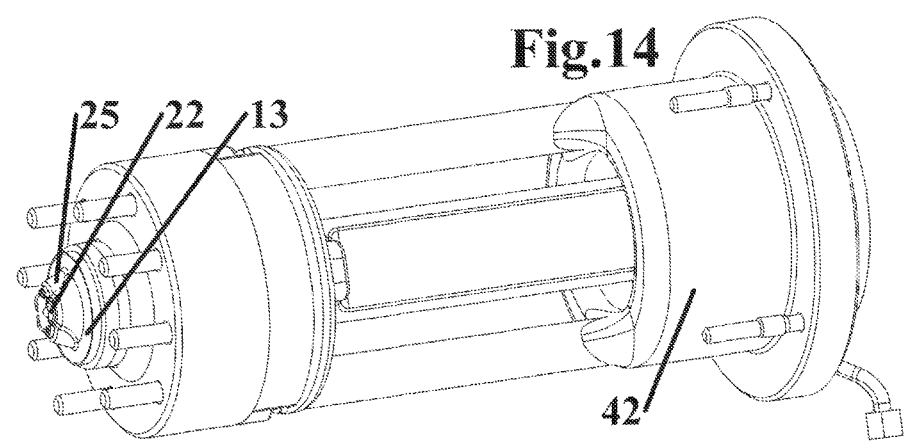
FIG. 14 shows an embodiment of an ignition source and a direct fuel injector for the insulated pulse engine.

The IPC engine uses a precision timed and precision positioned source of ignition to manage combustion and minimize creation of pollution emissions. In an embodiment, the ignition source, shown in FIG. 14, is a spark plug 25 with two insulated electrodes, with ignition coil 42 integrated into the assembly.

The spark plug 25 in the IPC engine, as shown in the section view of FIG. 15, is constructed in a manner which minimizes crevice-type volumes, since crevices trap fuel in locations which do not support efficient combustion. The ceramic and electrode of the spark plug 25 are constructed to resist stresses induced by a supersonic combustion shockwave.

Practical Application of the Insulated Pulse Engine

The IPC engine stratifies fuel within the central region 18 of the combustion chamber to enable clean combustion at high fuel efficiency. The IPC engine combusts cleanly when the stratified fuel-air equivalence ratio is nominally between 0.40 and 0.80, the actual range determined by the selected fuel. A stratified 0.80 equivalence ratio represents the full-throttle value and 0.40 represents the half-throttle value, with throttle position independent of crankshaft RPM. The IPC engine differs from Otto and Diesel engines in that Otto and Diesel engines handle low-throttle combustion operations without issue whereas the IPC engine does not permit throttle activity below half-throttle due to pollution susceptibility. When the equivalence ratio rises significantly above 0.80 in the IPC engine, the combustion reaction begins to slow and pollutants of the type which suggest oxygen deprivation begin to form. When the equivalence ratio drops significantly below 0.40 pollutants of the type which suggest an excessively cool reaction begin to form.

In the 3.2 liter 2-stroke IPC engine, an equivalence ratio of 0.80 arbitrarily translates to generating 65 horsepower at 4000 RPM (the arbitrary redline determined by combustion velocity and pollution constraints) and 0.40 arbitrarily translates to 32 horsepower at 4000 RPM. Anticipating the IPC engine will operate reliably as low as 1000 RPM, 0.40 generates as little as 8 horsepower. In order to achieve a 1000 RPM idle with no crankshaft load, an alternator or pump is tasked with dissipating the generated 8 horsepower as heat.

A method to more efficiently reduce power output at idle involves deselecting individual cylinders by halting direct fuel injection to them. If a pair of cylinders are deselected, a 4 horsepower minimum output at 1000 RPM can be achieved, tasking the alternator or pump with only 4 horsepower of heat dissipation.

Operating Sequence of the 2-Stroke Insulated Pulse Engine

An operating sequence of a 2-stroke IPC combustion chamber will now be presented, first in summary form and then in detailed form.

In an embodiment, the 2-stroke IPC engine incorporates an operating sequence summarized as follows:
1) Compression—33 mm BTC to 0.5 mm BTC
2) Ignition—0.5 mm BTC
3) Combustion—0.5 mm BTC to 0.5 mm ATC
4) Conventional expansion—0.5 mm ATC to 33 mm ATC
5) Hyper-expansion—33 mm ATC to 67 mm ATC
6) Induction—67 mm ATC to 90 mm BTC
7) Exhaustion—95 mm ATC to 33 mm BTC The 2-stroke IPC engine's cylinder block 31 includes intake ports 36 on a lower segment of the cylinder block bore 28 and exhaust ports 37 on a middle segment of the cylinder block bore 28. The detailed operating sequence comprises:

33 mm BTC: Exhaust ports close, compression of fresh air and traces of exhaust begins.

32 mm BTC: Fresh air begins adiabatically heating.

12 mm BTC: Combustion chamber transitions to become stratified.

08 mm BTC: Fuel is direct injected into the central region.

07 mm BTC: Perimeter region pumps fresh air toward central region, constraining fuel.

06 mm BTC: Direct fuel injection ends.

05 mm BTC: Air sourced from perimeter region generates turbulence in central region.

01 mm BTC: Fuel and air homogenously mixed in turbulent central region.

0.5 mm BTC: Spark ignites fuel and air mixture, combustion progresses rapidly.

0.2 mm BTC: Combustion reaction expands into transfer passageway.

0.2 mm ATC: Transfer passageway forces pure air back into perimeter region.

0.5 mm ATC: Combustion reaction completes and extinguishes in perimeter region.

05 mm ATC: Combusted gasses are adiabatically cooling in combustion chamber.

12 mm ATC: Stratified combustion chamber transitions to become single chamber.

33 mm ATC: Conventional expansion cycle ends, hyper-expansion cycle begins.

50 mm ATC: Chamber pressure at half-throttle reaches 1 bar, vacuum forms in chamber.

67 mm ATC: Hyper-expansion ends. Chamber pressure at full-throttle reaches 1 bar.

67 mm ATC: Intake ports in lower cylinder open.

67 mm ATC: Vacuum forms and draws fresh air into lower third of combustion chamber.

67 mm ATC: Upper 67 mm of chamber contains gasses with ⅛ to ¼ oxygen consumed.

95 mm ATC: Exhaust ports in upper cylinder begin to open. Intake ports are fully open.

100 mm BDC: Intake ports begin to close.

99 mm BTC: Lower ⅓ of combustion chamber contains air, upper ⅔ contains exhaust gasses.

95 mm BTC: Exhaust ports in upper cylinder fully open.

90 mm BTC: Intake ports in lower cylinder close.

89 mm BTC: Piston pushes oxygen-rich exhaust gasses in upper ⅔ chamber out exhaust ports.

33 mm BTC: Exhaust ports close, compression of fresh air begins.

Optimizing Idling Efficiency in the 2-Stroke Insulated Pulse Engine

A preferred embodiment of the 4-stroke IPC engine described above uses variable exhaust port timing apparatus to optimize the hyper-expansion cycle through the full range of engine operation from half-throttle to full-throttle. Due to limitations in available apparatus which permit variable induction port and exhaust port timing in a 2-stroke IPC engine embodiment, the hyper-expansion cycle of an embodiment of the 2-stroke IPC engine is tuned to operate most efficiently only at full-throttle. As the throttle position drops from full-throttle toward half-throttle, a level of vacuum forms in the combustion chamber toward the end of the hyper-expansion cycle. The presence of vacuum at the end of the hyper-expansion cycle results in blowdown-type pumping losses each time the induction ports open, negatively affecting part-throttle fuel economy to a small degree. The level of vacuum reaches a maximum when cylinders are deselected, as can be done to a pair of cylinders when the engine is idling, resulting in maximum blowdown energy losses at idle. The intrinsically low rate of fuel consumption at idle means the fuel cost of this inefficiency is comparatively low.

With the IPC engine designed to minimize all forms of friction in order to overcome low volumetric efficiency, blowdown energy loss can comprise a significant portion of "mechanism efficiency" at idle. At idle, when two cylinders are tasked to operate at half-throttle and two cylinders are deselected, chamber vacuum begins to form in the pair of half-throttle cylinders near 50 mm ATC and chamber vacuum begins to form in the pair of deselected cylinders at 33 mm ATC. Vacuum peaks in all four cylinders near 67 mm ATC, with the blowdown energy loss occurring when the induction cycle begins. Since there can be applications in which the IPC engine spends an inordinate amount of time operating with a pair of cylinders deselected, such as idling with an air conditioning pump operating, fuel savings can quickly accumulate if this induction blowdown inefficiency is resolved.

One resolution to induction blowdown losses at idle in a 2-stroke IPC engine embodiment is to add a circumferential band of ports in the cylinder block bore 28 which deactivates the hyper-expansion function when the cylinder is idling and which activates the hyper-expansion function when the cylinder is operating. This band of optional ports are named idling ports 43 and can be viewed in FIGS. 16A and 16B. They are positioned in the block between the induction ports 36 and exhaust ports 37 such that, when open, as shown in FIG. 16B, they provide an additional low-restriction connection between the chamber volume 11 and the exhaust plenum 30 for the purpose of preventing the formation of combustion chamber vacuum between 33 mm ATC and 67 mm ATC, effectively turning the hyper-expansion cycle completely off. An idling plunger 44, as shown in FIG. 17A, can then be installed into each of the idling ports 43 such that, when the idling port 43 becomes blocked by the plunger the hyper-expansion function is restored for optimal efficiency at full-throttle. The idling plunger 44 can be applied in the form of a two-position plunger which is pressed flush to the cylinder bore, as shown in FIG. 16A, to apply the hyper-expansion cycle, or is retracted outward from the cylinder block bore 28 to efficiently disable the hyper-expansion cycle, as shown in 16B, replacing hyper-expansion function with an exhaust reversion function. Detail of an actuating linkage for the idling plunger 44 is omitted.

Idling ports are not applicable to various embodiments of the 4-stroke IPC engine, since variable exhaust port timing apparatus in the 4-stroke IPC engine fully resolves this issue.

Idling Sequence of the 2-Stroke Insulated Pulse Engine

An idling sequence of a 2-stroke IPC combustion chamber will now be presented, first in summary form and then in detailed form.

In an embodiment, the 2-stroke IPC engine incorporates an idling sequence summarized as follows:
1) Compression—33 mm BTC to 0.5 mm BTC
2) Ignition—0.5 mm BTC
3) Combustion—0.5 mm BTC to 0.5 mm ATC
4) Conventional expansion—0.5 mm ATC to 33 mm ATC
5) Exhaust reversion—33 mm ATC to 67 mm ATC
6) Induction—67 mm ATC to 90 mm BTC
7) Exhaustion—95 mm ATC to 33 mm BTC In various embodiments, the 2-stroke IPC engine's cylinder block 31 includes intake ports on a lower segment of the cylinder block bore 28, exhaust ports 37 on a middle segment of the cylinder block bore 28, and idling ports 43 on a lower-middle segment of the cylinder block bore 28 which adjoin to the exhaust plenum 30. In an embodiment, the detailed idling sequence comprises:

33 mm BTC: Exhaust ports close, compression of fresh air and traces of exhaust begins.

32 mm BTC: Fresh air begins adiabatically heating.

12 mm BTC: Combustion chamber transitions to become stratified.

07 mm BTC: Perimeter region pumps fresh air toward central region. No fuel is injected.

0.2 mm ATC: Transfer passageway begins drawing pure air back into perimeter region.

12 mm ATC: Stratified combustion chamber transitions to become single chamber.

33 mm ATC: Chamber pressure reaches 1 bar, the hyper-expansion cycle begins.

33 mm ATC: Idling ports connected to exhaust plenum open and draw exhaust into cylinder.

67 mm ATC: Chamber pressure remains 1 bar. Idling ports connected to exhaust plenum close.

67 mm ATC: Hyper-expansion cycle ends. Intake ports in lower cylinder open.

67 mm ATC: Vacuum forms and draws fresh air into lower third of combustion chamber.

95 mm ATC: Exhaust ports in upper cylinder begin to open. Intake ports are fully open.

100 mm BDC: Intake ports begin to close.

95 mm BTC: Exhaust ports in upper cylinder fully open.

90 mm BTC: Intake ports in lower cylinder close.

89 mm BTC: Piston begins pushing gasses in upper ⅔ of chamber out exhaust ports.

33 mm BTC: Exhaust ports close, compression of fresh air begins.

Expansion Buffering

Expansion buffering is an optional function which broadens the throttle range in which the hyper-expansion cycle operates near peak fuel efficiency in the 2-stroke IPC engine. Expansion buffering can function in association with the idling ports 43, though it is independent of them. If idling ports 43 are omitted from an engine, expansion buffering uses only a circumferential band of small ports (not shown) cut into the cylinder block bore 28 which are positioned just above the induction ports 36 and which adjoin to the exhaust plenum 30. When expansion buffering is applied in conjunction with idling ports 43 (as shown in FIG. 16A), an optional expansion buffering aperture 45 is added to the lowest segment of the idling plunger 44, as shown in FIG. 17B. The expansion buffering aperture 45 is shown in the operating position in FIG. 16A and in the idling position in FIG. 16B.

The expansion buffering aperture 45 can recalibrate the hyper-expansion cycle away from a single-point optimum, nominally set at full-throttle, to a broader optimum range, nominally centered at ⅞-throttle (0.70 equivalency ratio in various embodiments), such that blowdown pumping losses can be minimized from ¾-throttle (0.60 equivalency ratio) through full-throttle and blowdown pumping losses can additionally be improved below ¾ throttle. The expansion buffering aperture 45 allows ¾-throttle cylinder operation to become more fuel-efficient by venting some cylinder vacuum which accumulates near the end of the hyper-expansion cycle, while full-throttle operation vents some excess combustion chamber pressure just prior to induction, assuring induction can proceed nominally.

Expansion buffering is not applicable to various embodiments of the 4-stroke IPC engine, since variable exhaust port timing apparatus in the 4-stroke IPC engine fully resolves this issue.

Expansion Buffering Sequence of the 2-Stroke Insulated Pulse Engine

An expansion buffering sequence of a 2-stroke IPC combustion chamber will now be presented, first in summary form and then in detailed form.

In an embodiment, the 2-stroke IPC engine incorporates an expansion buffer sequence summarized as follows:
1) Compression—33 mm BTC to 0.5 mm BTC
2) Ignition—0.5 mm BTC
3) Combustion—0.5 mm BTC to 0.5 mm ATC
4) Conventional expansion—0.5 mm ATC to 33 mm ATC
5) Hyper-expansion—33 mm ATC to 58 mm ATC
6) Expansion buffering—58 mm ATC to 67 mm ATC
7) Induction—67 mm ATC to 90 mm BTC
8) Exhaustion—95 mm ATC to 33 mm BTC The 2-stroke IPC engine's cylinder block includes intake ports 36 on a lower segment of the cylinder block bore 28, exhaust ports 37 on a middle segment of the cylinder block bore 28, and expansion buffer ports (not shown) in a lower-middle segment of the cylinder block bore 28 which adjoin to the exhaust plenum 30. In an embodiment, the detailed expansion buffer sequence comprises:

33 mm BTC: Exhaust ports close, compression of fresh air and traces of exhaust begins.

32 mm BTC: Fresh air begins adiabatically heating.

12 mm BTC: Combustion chamber transitions to become stratified.

08 mm BTC: Fuel is direct injected into the central region.

07 mm BTC: Perimeter region pumps fresh air toward central region, constraining fuel.

06 mm BTC: Direct fuel injection ends.

05 mm BTC: Air sourced from perimeter region generates turbulence in central region.

01 mm BTC: Fuel and air homogenously mixed in turbulent central region.

0.5 mm BTC: Spark ignites fuel and air mixture, combustion progresses rapidly.

0.2 mm BTC: Combustion reaction expands into transfer passageway.

0.2 mm ATC: Transfer passageway forces pure air back into perimeter region.

0.5 mm ATC: Combustion reaction completes and extinguishes in perimeter region.

05 mm ATC: Combusted gasses are adiabatically cooling in combustion chamber.

12 mm ATC: Stratified combustion chamber transitions to become single chamber.

33 mm ATC: Conventional expansion cycle ends, Hyper-expansion cycle begins.

50 mm ATC: Expansion buffer ports begin to open. Half-throttle hyper-expansion ends.

58 mm ATC: Expansion buffer ports substantially open. ¾-throttle hyper-expansion ends.

58 mm ATC: Chamber pressure 1.0 bar at ¾ throttle, 1.3 bar at full-throttle.

62 mm ATC: Below ¾ throttle, chamber vacuum draws from exhaust plenum.

62 mm ATC: At ⅞ throttle, gas exchange through expansion buffer is minimal.

62 mm ATC: At full-throttle, slight chamber pressure is vented into exhaust plenum.

67 mm ATC: From ¾ to full-throttle, expansion buffer maintains chamber pressure near 1 bar.

67 mm ATC: Expansion buffer closes, intake ports in lower cylinder open.

67 mm ATC: Vacuum forms and draws fresh air into lower third of combustion chamber.

67 mm ATC: Upper 67 mm of chamber contains oxygen-rich combusted gasses.

95 mm ATC: Exhaust ports in upper cylinder begin to open. Intake ports are fully open.

100 mm BDC: Intake ports begin to close.

99 mm BTC: Lower ⅓ of combustion chamber contains air, upper ⅔ contains exhaust.

95 mm BTC: Exhaust ports in upper cylinder fully open.

90 mm BTC: Intake ports in lower cylinder close.

89 mm BTC: Piston pushes combusted gasses in upper chamber out exhaust ports.

33 mm BTC: Exhaust ports close, compression of fresh air begins.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method of operating a combustion chamber apparatus including a cylinder bore; a primary end: a secondary end; a chamber volume bounded by the cylinder bore, the primary end, and the secondary end, the chamber volume based on a cylinder bore diameter and dependent on the position of the secondary end with reference to the primary end: wherein the cylinder bore is configured to seal to the primary end to prevent incidental leakage of chamber gasses; wherein the secondary end is configured to reciprocate within the cylinder bore between a top dead center (TDC) position nearest the primary end and a bottom dead center (BDC) position, and is configured to seal to the cylinder bore while reciprocating to prevent incidental leakage of chamber gasses; wherein the secondary end is configured to be linked to a crankshaft through a connecting rod for the purpose of exporting mechanical energy from the engine; wherein the chamber volume is configured to become fuel-stratified whenever the secondary end is closer than a stratified distance of TDC, and the chamber volume is configured to become fuel-unstratified whenever the secondary end is farther than the stratified distance from TDC; wherein the chamber volume when stratified comprises two regions, one is named a central region and the other is named a perimeter region, with a transfer passageway between the two regions, and wherein the chamber volume when unstratified comprises a single region; wherein the single region is configured to contain no fuel and does not need to support efficient combustion; wherein the perimeter region includes a volume bounded by an area of the cylinder bore between the primary end and the secondary end, an area of the primary end adjacent to the cylinder bore and near the cylinder bore, and an area of the secondary end adjacent to the cylinder bore and near the cylinder bore, and is configured to contain no fuel and does not need to support efficient combustion; wherein the central region includes a volume bounded by a central area of the primary end and a central area of the secondary end, and can be centered on the axis of the cylinder bore, and is configured to contain fuel at the time of ignition; wherein the transfer passageway includes a volume bounded by the remaining areas of the primary end and secondary end not occupied by the two regions, and can be annular, and is configured to contain no fuel at the time of ignition; wherein the central region and the transfer passageway are configured to combust fuel efficiently when the secondary end is positioned within a combusting distance of TDC; wherein an induction port apparatus located within the bounds of the cylinder bore and primary end not occupied by the central region or the transfer passageway is configured to open and close to transfer air into the chamber volume: wherein an exhaust port apparatus located within the bounds of the cylinder bore and primary end not occupied by the central region or the transfer passageway is configured to open and close to transfer gasses from the chamber volume; wherein an ignition apparatus is configured to control the timing and location of start of combustion within the central region; wherein a direct fuel injector is configured to inject fuel into the central region; wherein a cycle of the engine includes a sequence comprising a compression cycle, an expansion cycle, a hyper-expansion cycle, an exhaust cycle, and an induction cycle, wherein the exhaust cycle and the induction cycle can overlap and interchange; and wherein the hyper-expansion cycle comprises a hyper-expansion stage followed by a blowdown reduction stage, and wherein the blowdown reduction stage includes one of variable exhaust port timing or an expansion buffer configured to reduce blowdown-type pumping losses at the start of the induction cycle, the method comprising: using the transfer passageway as a conduit to transfer air from the perimeter region toward the central region for the purpose of reinforcing fuel-stratification while creating turbulence to mix fuel and air within the central region; timing fuel injection to end prior to ignition, wherein the ignition apparatus triggers a combustion cycle when the secondary end is within the combusting distance of TDC; and maintaining a compression ratio sufficient to promote a supersonic combustion wavefront, in combination with a fuel-air equivalence ratio in the central region maintained within the bounds of a half-throttle value and a full-throttle value to assure that combustion promptly develops in the central region, that combustion expands into the transfer passageway, and that combustion concludes within the transfer passageway while the secondary end remains within the combusting distance of TDC, such that no fuel reaches the perimeter region; wherein the blowdown-reduction stage is configured to reduce blowdown type pumping losses at the start of the induction cycle, wherein an idling port can be employed to reduce blowdown-type pumping losses when the combustion chamber is deselected at engine idle, and the expansion buffer can be employed to reduce blowdown-type pumping losses over a broad range between half-throttle and full throttle.

2. The method of claim 1, wherein the BDC is 100 mm from TDC, wherein the cylinder bore diameter is 100 mm, wherein the stratified distance is 12 mm from TDC, wherein a combusting distance is 0.5 mm from TDC, wherein direct fuel injection initiates at 8 mm BTC and completes at or before 6 mm BTC.

3. The method of claim 1, wherein the maximum fuel quantity permitted per combustion event, called the full-throttle value, is limited by the formation of exhaust pollutants associated with high pressure or high temperature levels within the chamber volume.

4. The method of claim 3, wherein the full-throttle value is represented by an equivalence ratio of 0.80 within the central region.

5. The method of claim 1, wherein the minimum fuel quantity permitted per combustion event, called the half-throttle value, is limited by the formation of exhaust pollutants associated with low pressure or low temperature levels within the chamber volume.

6. The method of claim 5, wherein the half-throttle value is represented by an equivalence ratio of 0.40 within the central region.

7. The method of claim 1, wherein the combustion chamber apparatus is a 4-stroke construction with 100 mm stroke such that a compression cycle occupies the secondary end position from 50 mm BTC until 0.5 mm BTC, a combustion cycle occurs from 0.5 mm BTC until 0.5 mm ATC, a conventional expansion cycle occurs from 0.5 mm ATC until 50 mm ATC, a hyper-expansion cycle occurs from 50 mm ATC until BDC, an exhaustion cycle occurs from BDC until 15 mm BTC, an incidental compression cycle occurs from 15 mm BTC until 15 mm ATC, an induction cycle occurs from 15 mm ATC until 100 mm BDC, and an induction reversion cycle occurs from 100 mm BDC until 50 mm BTC.

8. The method of claim 7, wherein the hyper-expansion cycle occurs in two stages, a hyper-expansion stage followed by a blowdown reduction stage, with the duration of each stage determined by throttle position, wherein the hyper-expansion stage is characterized by combustion chamber pressure remaining above 1 bar and the blowdown reduction stage is characterized by combustion chamber pressure dropping below 1 bar, such that at half-throttle a hyper-expansion stage occurs from 50 mm ATC until 75 mm ATC and the blowdown reduction stage occurs from 75 mm ATC until 100 mm BDC which opens the exhaust port apparatus when combustion chamber pressure drops below 1 bar to prevent the combustion chamber from developing a vacuum which would result in blowdown-type pumping losses at the start of the exhaust cycle.

9. The method of claim 1, wherein the combustion chamber apparatus is a 2-stroke construction with 100 mm stroke, such that the compression cycle occupies the secondary end position from 33 mm BTC until 0.5 mm BTC, the combustion cycle occurs from 0.5 mm BTC until 0.5 mm ATC, the conventional expansion cycle occurs from 0.5 mm ATC until 33 mm ATC, the hyper-expansion cycle occurs from 33 mm ATC until 67 mm ATC, the induction cycle occurs from 67 mm ATC until 100 mm BDC, and the exhaustion cycle occurs from 100 mm BDC until 33 mm BTC.

10. The method of claim 9, wherein, when the combustion chamber is deselected at engine idle, vacuum forms within the combustion chamber during a portion of the hyper-expansion cycle from 33 mm ATC until 67 mm ATC, when operating at half-throttle, vacuum forms within the combustion chamber during a portion of the hyper-expansion cycle from 50 mm ATC until 67 mm ATC, and when operating at full-throttle vacuum forms within the combustion chamber during a portion of the hyper-expansion cycle from 67 mm ATC until 67 mm ATC, wherein generated vacuum results in blowdown-type pumping losses at the start of the induction cycle.

* * * * *

UNITED STATES PATENT AND TRADEMARK OFFICE
CERTIFICATE OF CORRECTION

PATENT NO. : 9,920,684 B2  
APPLICATION NO. : 14/072369  
DATED : March 20, 2018  
INVENTOR(S) : David J. Schouweiler, Jr.

Page 1 of 3

It is certified that error appears in the above-identified patent and that said Letters Patent is hereby corrected as shown below:

In the Specification

In Column 7, Line 23, delete "IP" and insert --IPC-- therefor

In Column 9, Line 66, after "system", insert --.--

In Column 10, Line 19, delete "Fe60Ni40" and insert --$Fe_{60}Ni_{40}$-- therefor In Column 13, Line 21, delete "(CO2)" and insert --($CO_2$)-- therefor In Column 13, Line 21, delete "(H2O)," and insert --($H_2O$),-- therefor In Column 13, Line 23, delete "(NH3)" and insert --($NH_3$)-- therefor In Column 13, Line 24, delete "(N2)" and insert --($N_2$)-- therefor In Column 13, Line 24, delete "(H2O)" and insert --($H_2O$)-- therefor In Column 15, Line 11, delete "cycles," and insert --cycles.-- therefor In Column 20, Line 39, after "block", insert --,--

In Column 20, Line 45, delete "35." and insert --38.-- therefor

In Column 21, Line 3, delete "24" and insert --37-- therefor

In the Claims

In Column 27, Line 3, in Claim 1, after "including", insert --¶--

Signed and Sealed this  
Eighth Day of December, 2020

Andrei Iancu  
*Director of the United States Patent and Trademark Office*

CERTIFICATE OF CORRECTION (continued)
U.S. Pat. No. 9,920,684 B2

In Column 27, Line 3, in Claim 1, after "bore;", insert --¶--

In Column 27, Line 3, in Claim 1, delete "end:" and insert --end;¶-- therefor

In Column 27, Line 3, in Claim 1, delete "end;" and insert --end; and¶-- therefor In Column 27, Line 7, in Claim 1, delete "end:" and insert --end;¶-- therefor In Column 27, Line 9, in Claim 1, after "gasses;", insert --¶--

In Column 27, Line 15, in Claim 1, after "gasses;", insert --¶--

In Column 27, Line 17, in Claim 1, after "engine;", insert --¶--

In Column 27, Line 22, in Claim 1, after "TDC;", insert --¶--

In Column 27, Line 27, in Claim 1, after "region;", insert --¶--

In Column 27, Line 29, in Claim 1, after "combustion;", insert --¶--

In Column 27, Line 35, in Claim 1, after "combustion;", insert --¶--

In Column 27, Line 40, in Claim 1, after "ignition;", insert --¶--

In Column 27, Line 44, in Claim 1, after "ignition;", insert --¶--

In Column 27, Line 47, in Claim 1, after "TDC;", insert --¶--

In Column 27, Line 51, in Claim 1, delete "volume:" and insert --volume;¶-- therefor In Column 27, Line 55, in Claim 1, after "volume;", insert --¶--

In Column 27, Line 57, in Claim 1, after "region;", insert --¶--

In Column 27, Line 58, in Claim 1, after "region;", insert --¶--

In Column 27, Line 63, in Claim 1, after "and", insert --¶--

In Column 28, Line 1, in Claim 1, after "comprising:", insert --¶--

In Column 28, Line 5, in Claim 1, after "region;", insert --¶--

In Column 28, Line 8, in Claim 1, after "and", insert --¶--

CERTIFICATE OF CORRECTION (continued)
U.S. Pat. No. 9,920,684 B2

In Column 28, Line 18, in Claim 1, after "region;", insert --¶--

In Column 28, Line 19, in Claim 1, delete "blowdown type" and insert --blowdown-type-- therefor